(12) United States Patent
Lichten et al.

(10) Patent No.: US 6,295,021 B1
(45) Date of Patent: Sep. 25, 2001

(54) TECHNIQUES FOR MONITORING AND CONTROLLING YAW ATTITUDE OF A GPS SATELLITE

(75) Inventors: Stephen M. Lichten, Pasadena; Yoaz Bar-Sever, Altadena; James Zumberge, San Marino; William I. Bertiger, Altadena; Ronald J. Muellerschoen, Pasadena; Sien-Chong Wu, Torrance; Kenneth Hurst, Lebec, all of CA (US); Geoff Blewitt, Durham (GB); Thomas Yunck, Pasadena, CA (US); Catherine Thornton, Arcadia, CA (US); Michael Heflin, La Cresenta, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 09/377,308

(22) Filed: Aug. 18, 1999

Related U.S. Application Data

(62) Division of application No. 08/816,260, filed on Mar. 13, 1997, now Pat. No. 5,963,167

(60) Provisional application No. 60/013,368, filed on Mar. 13, 1996.

(51) Int. Cl.[7] .............................. H04B 7/185; B64G 1/36
(52) U.S. Cl. ............................................ 342/355; 244/171
(58) Field of Search ....................... 342/357.02, 357.06; 244/171

(56) References Cited

U.S. PATENT DOCUMENTS 5,452,869 * 9/1995 Basuthakur et al. ................. 244/164
5,546,309 * 8/1996 Johnson et al. ....................... 364/434
5,828,336 * 10/1998 Yunck et al. .......................... 342/357

* cited by examiner

Primary Examiner—Mark Hellner
(74) Attorney, Agent, or Firm—Fish & Richardson P.C.

(57) ABSTRACT

Techniques for monitoring and controlling yawing of a GPS satellite in an orbit that has an eclipsing portion out of the sunlight based on the orbital conditions of the GPS satellite. In one embodiment, a constant yaw bias is generated in the attitude control system of the GPS satellite to control the yawing of the GPS satellite when it is in the shadow of the earth.

19 Claims, 16 Drawing Sheets

TECHNIQUES FOR MONITORING AND CONTROLLING YAW ATTITUDE OF A GPS SATELLITE

This application is a divisional application of U.S. application Ser. No. 08/816,260, filed on Mar. 13, 1997, now issued as U.S. Pat. No. 5,963,167, which claims the benefit of U.S. Provisional Application No. 60/013,368 filed on Mar. 13, 1996.

This Application claims the benefit of the U.S. Provisional Application No. 60/013,368, filed on Mar. 13, 1996, the entirety of which is incorporated herein by reference.

ORIGIN OF THE INVENTION

The invention described herein was made in the performance of work under a NASA contract and is subject to the provisions of Public Law 96-517(35 U.S.C. 202) in which the Contractor has elected to retain title.

FIELD OF THE INVENTION

The present invention relates to improvements in accuracy and automation of detecting a three dimensional position of an object using positioning tools. More specifically, the present invention teaches refinements in determining positions on or near the earth, or in space by using the Global Positioning System (GPS), and/or using general satellite tracking systems.

BACKGROUND AND SUMMARY OF THE INVENTION

The Global Positioning System (GPS) enables determination of a position of a user with a GPS receiver in time and space; that is, the x, y, z and t coordinates of the GPS receiver. In its simplest term, this is accomplished by the triangulation between a number of orbiting satellites with known geo-locations. The range between a GPS satellite and the GPS receiver is obtained by multiplying the radio signal transmission time by the speed of light. This range is often called "pseudorange", however, since various errors including timing errors make this range different from the real distance between the GPS satellite and the GPS receiver. At least four GPS orbiting satellites are needed to uniquely determine a position plus the clock for a user. Additional satellites are desirable for further correcting timing errors and other errors and using redundancy for cross checking the measurements.

Time stamps are received as positioning from each of the satellites, to inform the position of the satellite and the time of the transmission. The user can triangulate using this information to determine the position at which the information was received, with high accuracy.

The accuracy of this positioning detection, however, is intentionally limited. A U.S. policy directive limits the amount of accuracy that is obtainable from GPS. A dither algorithm, called Selective Availability ("SA") and used as a part of the signals transmitted by the GPS, ensures that the clock and ranging data are only accurate to the level of 50–100 meters without knowledge of the dithering algorithm. Accordingly, only those authorized users who are permitted by the Department of Defense to obtain the dither key can receive clock and ranging data to a few-meter accuracy. The GIPSY-OASIS II software provides techniques to substantially improve positioning accuracy to the sub-centimeter level both for civilian users of GPS who are affected by the SA dither and for the users authorized for knowledge of the dither key.

Various techniques have been used in the prior art to improve the resolution of the data available from the Global Positioning System (GPS). These techniques are well-known in the art. Jet Propulsion Laboratory (JPL), the assignee of this application has been very active in this area since 1979. The results of the continuous effort at JPL for over a decade are a versatile processing system, GIPSY-OASIS II. This software was initially developed at JPL to support various precise differential GPS applications. GIPSY-OASIS II includes two major elements: the GPS-Inferred Positioning System (GIPSY) for processing actual GPS data; and the Orbit Analysis and Simulation Software (OASIS) for performing simulations, covariance analyses, and system design trade studies.

The principal applications currently supported by GIPSY-OASIS II include precise orbit determination for low earth satellites that carry GPS receivers; daily determination of GPS satellite precise orbits and relative clock offsets for the International GPS Service; and numerous investigations in regional and global geodesy for the study of solid earth dynamics. Each of these applications employs data collected by a permanent network of GPS reference receivers, which now number more than 150 sites worldwide, and each involves the continuous computation of GPS satellite orbits and clock offsets as well as all ground receiver clock offsets from a network reference time. For the past two years, the 3D accuracy for the GPS satellite orbits computed with GIPSY-OASIS has been 10–15 cm (RMS), and relative clock offset accuracies between ground sites have better than a few tenths of one nanosecond worldwide. The estimated GPS orbits can be propagated forward for about 1–2 days with a 3D RMS accuracy of 1 m or better, as demonstrated by direct comparison of predicted and filtered orbits.

The commercially-available GIPSY-OASIS II system has been used for GPS data analysis, automated GPS orbit production, many differential GPS applications, and in particular, many non-GPS analysis capabilities. JPL currently-collects GPS data every day from a global network of receivers and each day estimates all GPS orbits, all receiver locations, all clocks, and a host of geodetic and miscellaneous parameters. The daily repeatability of the 3D global geocentric station locations is better than 1 cm, far surpassing the 50–100 meters accuracies typical of ordinary users or the few meters of accuracy typical of authorized users. The GIPSY-OASIS II architecture offers unique advantages such as high accuracy at centimeter level for both ground and space applications, automated and fast operations, and adaptability to non-GPS applications. Therefore, this software has attracted numerous applications and users worldwide including applications in GPS, non-GPS orbiters, FAA, military and users in commercial sectors, government agencies, universities and research institutions.

GIPSY-OASIS II processes the data through a general Kalman sequential filter smoother which runs considerably faster than real time for its current tasks on various standard UNIX workstations. For many applications the system is configured to operate entirely automatically and can deliver validated daily solutions for orbits, clocks, station locations, and many other parameters, conveniently with no human intervention.

GPS phase and pseudorange data are retrieved automatically (generally through the Internet or phone lines) from each station, passed on to an expert system which edits and validates them, and then delivers them to the estimation sequence. Extensive post-estimation verification is carried out so that anomalous points, if any, are deleted and the solution readjusted through a fast down-dating process (rather like a Kalman update done in reverse), and detailed performance statistics are generated, again automatically.

GIPSY-OASIS II has been developed as a general purpose GPS data analysis system. The system is highly modular to allow a maximal flexibility. There are about dozen key modules and sub-modules that may be called in sequence (or a sub-sequence may be iterated) in the course of an estimation process. Different modules are independent to each other but their operations are controlled by a higher-level executive having a plurality of UNIX shell scripts. In a routine or automated operation, the UNIX shell scripts effectively take the place of an analyst to control and monitor the data analysis and simulation. In a non-standard application, an analyst may choose to execute a group of particular modules individually. In addition, the UNIX shell scripts in GIPSY-OASIS II can be complex and sophisticated to minimize processing faults and to perform everything from intelligent memory and file management to exhaustive verification and correction of the computed products.

One virtue of this architecture of independent subordinate modules and controlling UNIX shell scripts is that GIPSY-OASIS II can be applied to virtually any GPS estimation problem, optimized and automated for that purpose, simply by modifying (or creating) a relatively small amount of UNIX script. In most cases the GIPSY-OASIS code itself (e.g., editing and data conditioning, model and partial derivative computation, filtering and smoothing, and post fit validation), which has been optimized for numerical stability, precision, and computational efficiency over many years of demanding use, need not be touched at all.

It is a first objective of the present invention to even further refine this accuracy, however, using some new models which have been found to relieve some of the limitations of the previously released GIPSY-OASIS II system.

It is another object of the present invention to improve the accuracy available from the GPS in a new and unobvious way.

It is yet another object of the present invention to define special techniques which can be used to manipulate global positioning satellite information in a way which enhances the usability of this information.

It is still another object of the present invention to adapt these techniques to other positioning tools besides the GPS system.

In accordance with the invention, one preferred method for GPS positioning and satellite tracking comprises: collecting broadcast signals of a plurality of earth-orbiting satellites with a plurality of earth-fixed receivers, said broadcast signals being indicative of timing and positioning of said satellites; converting said broadcast signals into raw data in digital form; editing said raw data to remove an amount of data points based on a data selection criterion and to detect carrier phase breaks therein based on a phase criterion, thus producing refined data indicative of pseudo-ranges of said satellites; computing a plurality of forces acting on said satellites; estimating effects of earth geometric factors and a plurality of transmitting delays of said broadcast signals; performing a yaw compensation on yawing of said satellites; computing orbiting trajectories of said satellites by using a priori model and said refined data with information indicative of said forces, said effects of earth geometric factors, said transmitting delays, and said yawing; producing updated data of said satellites by using a Kalman-type filter/smoother and said orbiting trajectories of said satellites, said updated data having information indicative of said timing and said positioning of satellites; predicting said orbiting of said satellites with said updated data and information from said yaw compensation to produce updated orbits of said satellites; and verifying said updated orbits of said satellites.

Additional objects and advantages of the present invention will be set forth in part in the detailed description which follows, and in part will be obvious from the description, or may be learned by practice of the present invention.

BRIEF DESCRIPTION OF THE DRAWINGS

These and other aspects of the present invention will become apparent in the detailed description herein with reference to the following accompanying drawings, in which:

FIG. 6a is the results without the yaw compensation and FIG. 6b uses the new yaw attitude model.

DETAILED DESCRIPTION OF THE INVENTION

Figure 1:
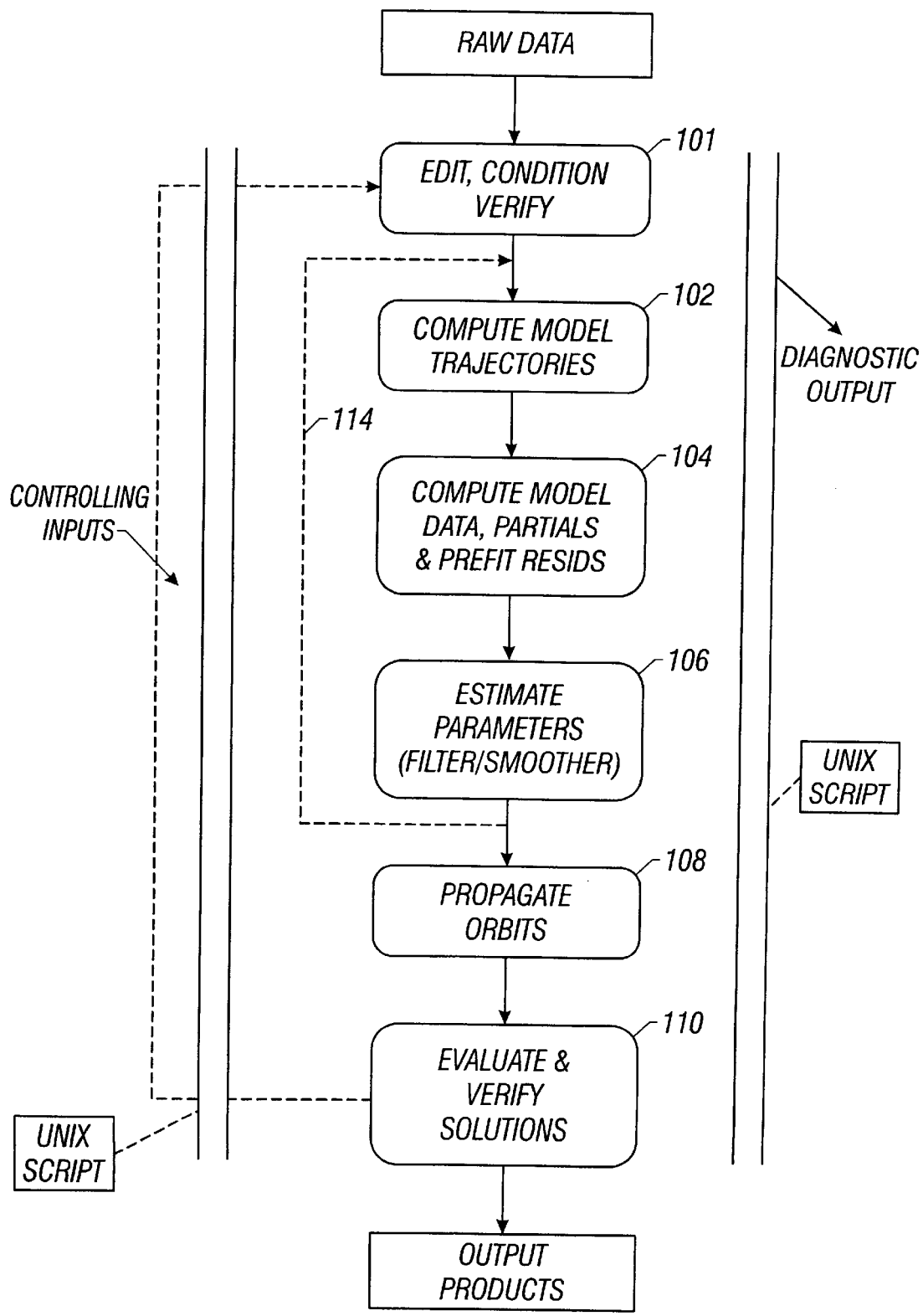
FIG. 1 is a flowchart showing the basic organization and modules of the GIPSY-OASIS II software.

FIG. 1 shows an overall block diagram of the basic organization and modules of the GIPSY-OASIS II software. In a standard GIPSY-OASIS II solution for GPS orbits, system clocks, and geodetic parameters, the typical sequence of events is as follows. Raw measurements arriving from the ground stations are first formatted, edited, conditioned, and verified at step 101. The editing process in step 101 identifies and removes outlier data points from prefit tests. The editing process further identifies and connects carrier phase breaks. GIPSY-OASIS II is designed to process continuously-counted carrier phase, also known as integrated Doppler data, as well as pseudorange. Much of the initial data conditioning is devoted to detecting and correcting breaks and cycle slips in the phase data. The next step, which in practice may be accomplished before the data is taken, is computation of an a priori model of the GPS orbits at step 102. This is helpful because the orbit estimation problem is inherently nonlinear, and must be linearized through estimation of a linear correction to an accurate a priori model. Predictor/corrector variable step integrator computes satellite trajectories.

Generation of the model orbits requires the computation and integration of precise models of the various forces acting on the satellites such as various gravitational effects (e.g., earth, sun, moon), solar pressure, thermal radiation, atmospheric drag, and gas leaks. The model orbits, together with known receiver locations and other geometric and signal delay effects, permit computation of the a priori measurement models. Examples of the geometric models include earth orientation, tides, ocean/atmosphere loading, general relativity, crustal plate motion, GPS yaw model, atmospheric path delays, and phase windup. The difference between the measurement models are then obtained by using the actual measurements to, form the prefit residuals at step 104, which are the actual observables used in the estimation step 106. The force and geometric models also permit computation of the matrix of partial derivatives (the coefficients in the linear regression equation) needed for the estimation. The observables and partials are then fed into the filter smoother at step 106 for estimation of the orbits and other state parameters, which may include adjustments to the force models.

An orbit mapper propagates the estimated orbits to any desired epoch before or after the current time at step 108, applying the precise force models in the process.

Finally, various programs are available for the evaluation and verification of the estimated parameters at step 110.

The executive UNIX script (or an analyst) generates the controlling inputs, interprets and responds to the diagnostic outputs. Step 114 shows an iterating loop for computation of models and partials, along with the filtering process in step 106 to improve the solution if the initial model is not sufficiently accurate. Such iteration for improved accuracy can also be done by feeding the solutions from step 110 back to the input of step 102 as indicated by loop 112.

Experience of the inventors has shown, however, that the accurate GIPSY-OASIS II models, even when initialized only with the broadcast ephemeris, permit the GPS satellite orbits to be estimated with an accuracy of tens of centimeters in one pass, and further iteration may produce additional improvement.

GIPSY-OASIS II incorporates the most precise and up-to-date models available. These include models of the forces acting on the GPS satellites, of the observing geometry, and of signal propagation delays. The force models include the latest earth gravity model (JGM-3, released jointly by the Goddard Space Flight Center and the University of Texas), a model of the gravitational effects of solid and ocean tides, the Rock-42 solar radiation pressure model (significantly modified and tuned at JPL), satellite thermal radiation and atmospheric drag models. In addition to the physical force models, GIPSY-OASIS II provides several empirical models, such as nonspecific constant and once- and twice-per-orbit forces that can efficiently absorb force model errors. Geometric models include variable earth rotation (UT 1) and polar motion, solid earth tides, ocean and atmospheric loading effects, and crustal plate motion.

The inventors of the present invention found a satellite yaw model which improves the operation by computing both the geometric effect (the transmitter phase center is slightly offset from the satellite center of gravity and the carrier phase changes due to transmitter rotation) and the dynamic effect of GPS yaw attitude variations.

A first improvement to the model as described herein is a model of the "yaw bias"; the action of the satellites as they pass into, through, and out of the earth's shadow as well as a special turning of the satellite when in full sun. As described herein, an initial yaw model was instituted by the DOD in June 1994 at JPL's suggestion after analysis showed that, if properly modeled, the yaw bias could improve orbit accuracy during eclipse periods. Any or all of these models can be adjusted (or "tuned") during the estimation process to improve orbit accuracy. The improved GIPSY-OASIS II is the only system in current existence with this capability for GPS yaw attitude estimation.

GIPSY-OASIS II also models the up and down links to and from geosynchronous satellites. GIPSY-OASIS II models and estimates the geosynchronous (GEO) transponder delay, which is necessary to achieve an accurate GEO orbit and is needed by users of the GEO pseudorange.

GIPSY-OASIS II can process a wide variety of data types including range, pseudorange, delta range, Doppler, angle data, integrated Doppler and angle data. There is no limit (aside from computer memory) to the number of transmitters and receivers that can be simultaneously served and estimated: for maximum flexibility GIPSY-OASIS II allows any "node" in the system to be defined as both transmitter and receiver.

The GIPSY-OASIS II estimator is organized as a general Kalman filter smoother with process noise models. This means that any estimated parameter can be modeled as either a deterministic or a stochastic process, or a combination of the two. A deterministic model obeys a set functional form (e.g., a quadratic or a Newtonian trajectory), of which the defining parameters may be estimated from a possibly long history of data. A stochastic model (e.g., random walk or colored noise) accepts some degree of unpredictability or moment-to-moment randomness in the quantity being estimated and thus depends more heavily on local geometric information in the data to produce an estimate. In the extreme case of a white noise model, in which the current value is assumed uncorrelated with previous or future values, only data from the current time step contribute directly to the estimate of the current value. The general formulation for all system parameters (or state variables) is a deterministic component with an added stochastic component, which can be set to zero.

Examples of estimated parameters that have been shown to benefit from some degree of stochastic modeling are the solar radiation pressure acting on the GPS satellites (which can vary irregularly on a time scale of hours), atmospheric propagation delays at the ground sites, and system clocks. The present inventors have noted that the specifications for various GPS-based ground tracking systems call for meteorological data (pressure, temperature, humidity) to be collected at each ground site to help calibrate the atmospheric delays. An example of this is the FAA's Wide Area Augmentation System (WAAS) for GPS, to be used starting in the late 1990s for navigation of commercial aircraft over the U.S. While pressure data can provide an accurate measure of the dry atmospheric delay, it has long been shown that local humidity is all but worthless for modeling the wet delay, which in nearly all locations dominates the atmospheric delay error. Thus, the weather data together tends to have little or no value in calibrating the total atmospheric delay. By continuously estimating the zenith atmospheric delay as a tightly constrained random walk, with an update every few minutes, GIPSY-OASIS typically reduces the net zenith atmospheric error to 1 cm or less. This compares with 3–10 cm errors typical for wet delay models derived from humidity data.

Another improvement of the present invention is in clock estimation. As described above, the satellite clocks are subject to SA dither. Even the best clocks occasionally degrade or even fail. The system clocks (receiver and satellite) are modeled as white noise (i.e., estimated independently at each time step) with essentially no degradation of other estimates. This has the advantage of eliminating all effects of dither or other clock misbehavior on the orbit solutions, while providing instantaneous independent updates of that behavior from second to second.

This has special advantages in the dense WAAS network. The method used in GIPSY-OASIS II uniquely permits nearly complete separation of the "fast" estimates (dominated by SA dither and clocks) and "slow" estimates (dominated by GPS orbits). This separation permits nearly instantaneous identification of faulty GPS data. Such fault detection is not possible with other systems. This is extremely important for safety in WAAS, which is to be used for commercial airline navigation. (Note that the "clock offset" estimates may actually include various instrumental and cable delay biases common to all signals, which have the same effect as time offsets within the clocks.) A real-time version of GIPSY-OASIS is being readied by JPL to be used as the prototype for the final WAAS GPS software.

The GIPSY-OASIS II software, available from Jet Propulsion Laboratory, Pasadena, Calif., is a commercial embodiment of these techniques. Many known algorithms have also been used within this advanced software for analysis of tracking data from Earth orbiting satellites. It has special modeling and estimation capabilities for the Global Positioning System (GPS). The present invention also offers many powerful simulation and covariance analysis capabilities used in system design and tracking accuracy assessment. The software has been used in analysis of tracking data from low-Earth altitude (500 km) to geosynchronous-altitude (36,000 km) and has a demonstrated capability for 2-cm orbit accuracy in low-Earth orbit. It handles multi-station, multi-satellite data as well as satellite-satellite tracking scenarios. For GPS satellites, orbit accuracies of 10–30 cm are routinely obtained in automated, daily data processing. Recent geosynchronous tracking analyses have demonstrated potential for meter-level orbit accuracy.

The inventors found that it was extremely important that dynamic and geometric models be correct and complete in order to allow accurate estimation of spacecraft trajectories. The system of the present invention carries out a number of advantageous features, as explained in the following:

As described above with respect to FIG. 1, precise determination of satellite orbit are based on knowing the position of the satellite over an interval of time. This requires modeling the forces that act on a GPS satellite. The models used according to the present invention enable determination of millimeter effect on the orbits.

GOA II is packaged with a library of output utilities to manipulate solutions in a variety of formats and reference frames. Utilities are available for handling ground station coordinates and computing baseline information and statistics; for satellite ephemeris comparisons and computations; for orbit propagation and prediction; for transformations between different reference frames, including inertial and Earth-fixed; for output of orbits in a variety of different data formats; for statistical analysis of post-fit residuals; and for calculations relating to estimates for other parameters.

There are currently several automated GPS analysis procedures running daily with GOA II at JPL. These procedures are being used to produce real-time and near-real time precise ephemerides for Topex/Poseidon (at 1336 km altitude), which carries a GPS flight receiver, and for the GPS satellite themselves. Currently there is about a 6-hour time lag for production of 5-cm accurate (radial) orbits for Topex/Poseidon. Real-time knowledge (from orbit predictions) can be maintained to better than 1 meter level.

The following new features have been added to GIPSY-OASIS II to even further improve its operation.

Yaw Compensation

An important feature of the present invention is its ability to properly model the yaw attitude of GPS satellites. GPS satellites orient themselves relative to sunlight. When the satellite enters a point in its orbit where it is blocked from the sun the satellite has no reference with which to orient itself. The inventors recognized that this has caused the control system of the satellite to oscillate wildly. The satellite tumbles around looking for sunlight to follow, often resulting in an unmodelable attitude.

The improved GIPSY-OASIS II system of the present invention compensates this by modeling a fake light in the dark to prevent the oscillation. This new feature in yaw compensation improves the accuracy of the trajectory modeling in step 102 and the propagation of orbits in step 108 of the improved GOA II system shown in FIG. 1. This feature is described with details as follows.

A satellite's eclipse season is a period during which the satellite crosses the Earth shadow once every revolution. There are times when the satellite is in shadow crossing— during those times, the satellite's view of the Sun is obstructed partially or fully by the Earth.

Figure 2:
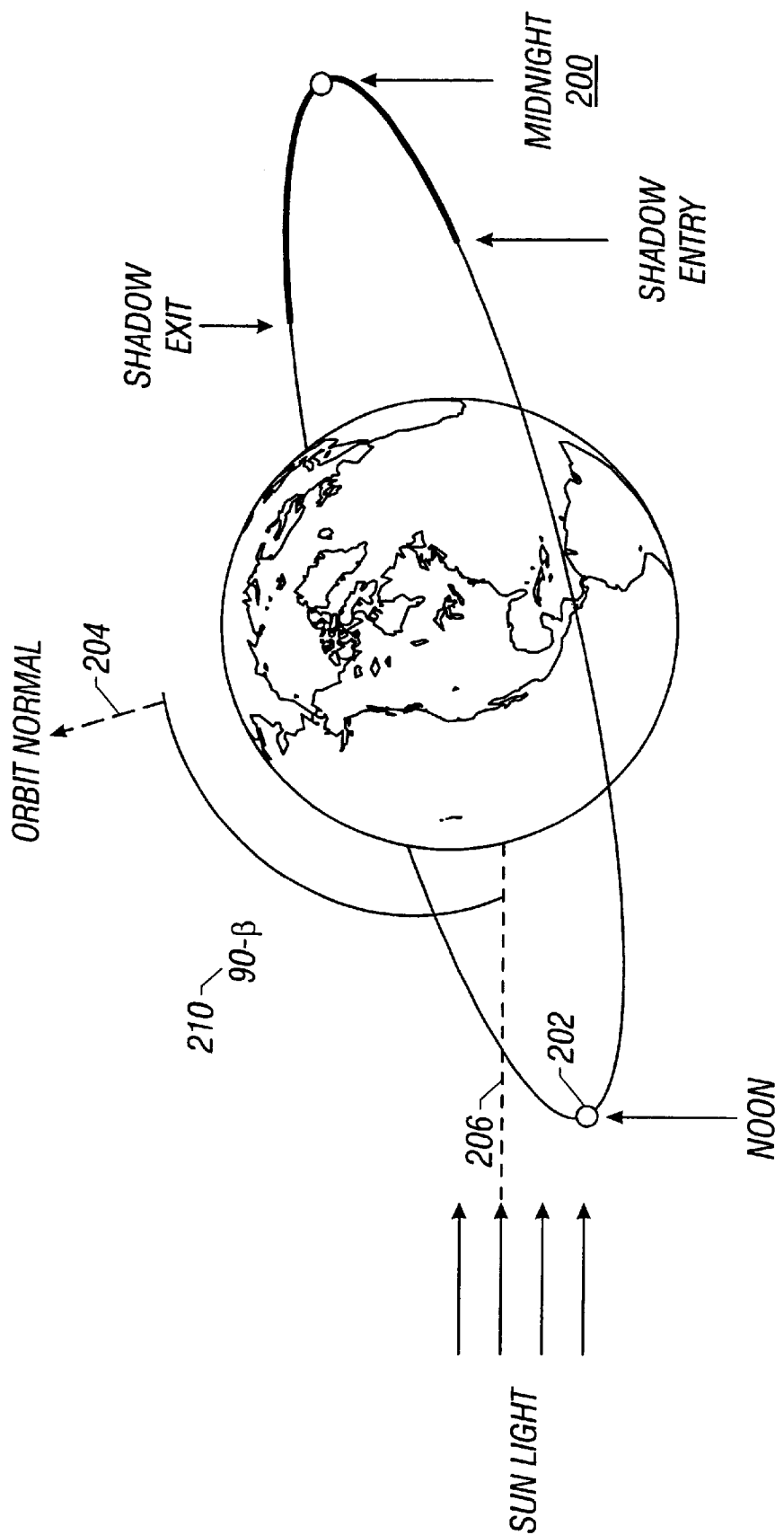
FIG. 2 is a schematic illustrating the geometry of an eclipsing orbit of a satellite.

A GPS satellite goes through eclipse season approximately every six months, and the length of the eclipse season varies between four to eight weeks. A typical orbit geometry during eclipse season is depicted in FIG. 2. The following words will be used herein in the following ways:

Midnight: the point on the orbit furthest from the Sun, the point 200 in FIG. 2.

Noon: The point of the orbit closest to the Sun, i.e., point 202 in FIG. 2.

Orbit Normal: Unit vector along the direction of the satellite angular momentum; vector 204 in FIG. 2.

Sun Vector: The direction from the earth to the Sun indicated by vector 206 in FIG. 2.

Beta Angle: The acute angle between the Sun vector and the orbit plane; angle 210 in FIG. 2. The beta angle is defined as positive if the Sun vector forms an acute angle with the orbit normal and negative otherwise.

Midnight Maneuver: The yaw maneuver the spacecraft is conducting from shadow entry until it resumes nominal attitude sometime after shadow exit.

Noon Maneuver: The yaw maneuver the spacecraft conducts in the vicinity of orbit noon when the nominal yaw rate would be higher than the yaw rate the spacecraft is able to maintain. It ends when the spacecraft resumes nominal attitude.

Spin-Up/Down Time: The time it takes for the spacecraft to spin up or down to its maximal yaw rate. The spacecraft is spinning down when it has to reverse its yaw rate.

Orbit Angle: The angle formed between the spacecraft position vector and orbit midnight, growing with the satellite's motion.

Yaw Origin: A unit vector that completes the spacecraft position vector to form an orthogonal basis for the orbit plane and is in the general direction of the spacecraft velocity vector.

Spacecraft-Fixed Z Axis: The direction of the GPS navigation antennae.

Nominal Spacecraft-Fixed X Axis: A unit vector orthogonal to the Spacecraft-fixed Z axis such that it lies in the Earth-spacecraft-Sun plane and points in the general direction of the Sun. (Note: this definition is not single valued when the Earth, spacecraft and Sun are collinear.)

Spacecraft-Fixed X Axis: A spacecraft-fixed vector, rotating with the spacecraft, such that far enough from orbit noon and orbit midnight it coincides with the nominal spacecraft-fixed X axis. Elsewhere it is a rotation of the nominal spacecraft-fixed X axis around the spacecraft-fixed Z axis.

Nominal Yaw Angle: The angle between the nominal spacecraft-fixed X axis and the yaw-origin direction, restricted to be in [−180,180]. It is defined to have a sign opposite to that of the beta angle.

Yaw Angle: The angle between the spacecraft-fixed X axis and the yaw-origin direction, restricted to be in [−180, 180]. Also termed "actual yaw angle".

Yaw Error: The difference between the actual yaw angle and the nominal yaw angle, restricted to be in [−180,180].

Eclipse season begins for a GPS satellite typically when its beta angle goes below 13.5° in absolute value. The time that the satellite spends in the Earth shadow increases as the beta angle approaches zero, up to a maximum of about 55 minutes.

A GPS satellite determines its nominal yaw attitude by satisfying the following conditions: (1) the navigation antennae preferably point toward the geocenter, and (2) the normal to the solar array surface is preferably pointing at the Sun. The satellite needs to yaw constantly in order to meet these two conditions. As the beta angle approaches zero, the required yaw maneuver becomes sharper around the orbit's noon ("noon turn") point 202 and midnight ("midnight turn") point 200. For zero beta angle, the nominal theoretical yaw rate at the orbit's noon and midnight points becomes infinite.

Despite being unphysical for small beta angles, the nominal yaw attitude model was used in most GPS navigation software packages. The inventors found, however, that there was a degradation in orbit determination accuracy of GPS satellites throughout the eclipse season. This suggested that there were additional problems with the nominal model beyond those that had been previously noticed.

An investigation by the inventors showed that the GPS satellites exhibit behavior that spans the spectrum from full yaw rate in one direction throughout shadow crossing, to reversing yaw rate direction during shadow, to periodic freezing and yawing at various rates. In short, the present inventors found that the attitude of the GPS satellites during shadow was observed to be essentially random and hence impossible to model.

The inventors analyzed the Attitude Control System (ACS) on a GPS satellite and found a cause that at least partially contributes to the random behavior during shadow. The ACS determines the yaw attitude of the satellite by using a pair of solar sensors mounted on the solar panels. As long as the Sun is visible, the signal from the solar sensors is a true representation of the yaw error. During shadow (in the absence of the Sun), the output from the sensors is essentially zero and the ACS is driven in an open loop mode by the noise in the system. The present inventors found that in this open loop mode, even a small amount of noise can be enough to trigger a yaw maneuver at maximum rate.

The randomness of the yaw attitude of GPS satellites during shadow reduces the quality of a high precision navigation solution since it implies two major modeling errors—dynamic and kinematic. Dynamically, the solar pressure and heat radiation forces on the satellite are mismodeled, both in magnitude and direction, since they depend strongly on the satellite's attitude. The solar pressure force is active only outside shadow but then, for as long as 30 minutes, the satellite is maneuvering to regain its nominal attitude in an unmodelable way (since its attitude upon shadow exit is not known). Kinematically, the mismodeling of the radiometric measurement is two-fold. Because the GPS satellite's antenna phase center is about 20 cm off the satellite's yaw axis, misplacing the phase center due to attitude mismodeling can give rise to a ranging error of up to 10 cm for some receivers. The range error will be largest for receivers furthest away from satellite nadir.

Another kinematic effect is from mismodeling of the wind-up effect. The wind up effect is known (see Wu, et al, "Effects of Antenna Orientation on GPS Carrier Phase, Manuscripta Geodaetica, 19, 1993, pp. 91–98), but prior to the present invention, no one had ever noticed its effects on eclipsing satellites. The present inventors found that the phase wind-up is an important element in the modeling of the radiometric measurement. It relates to the relative orientation of a transmitter-receiver pair.

Since the GPS signal is right-hand-circularly-polarized, any rotation of the transmitter will be interpreted by a phase-tracking receiver as a phase change. Without proper modeling, the tracking receiver will interpret this as a change in range. Errors of this nature are proportional to the carrier wavelength and the number of un-modeled rotations of the transmitter.

Figure 3:
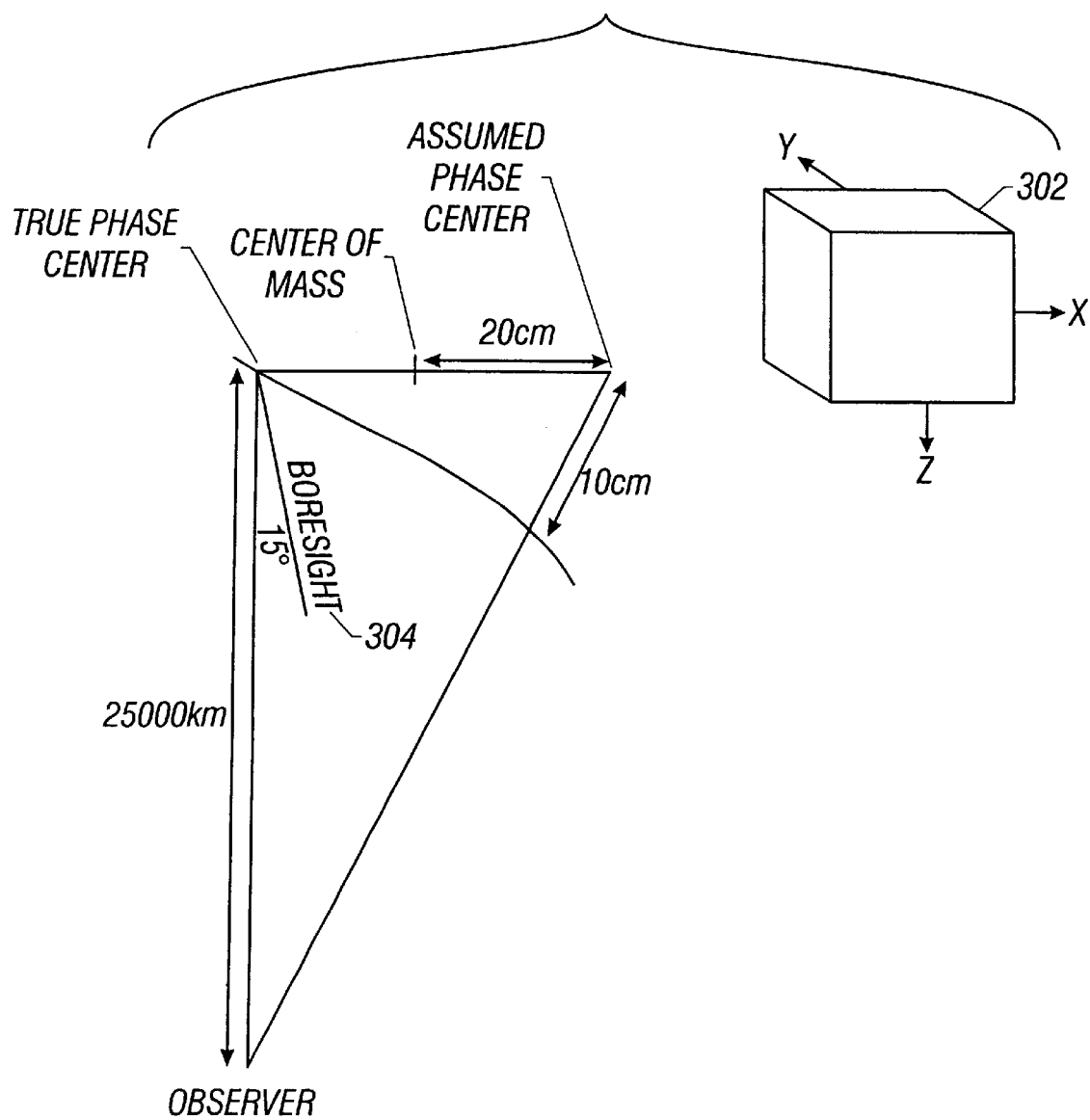
FIG. 3 is a schematic showing the misplacement of the phase center due to attitude mismodeling.

FIG. 3 shows the misplacement of the phase center due to attitude mismodeling. The Z axis 300 of the schematic GPS satellite 302 in FIG. 3 denotes the yaw axis. A receiver 15° off the GPS satellite boresight 304 can suffer from 10 cm range error as a result of a 40-cm lateral error in modeling the phase center of the transmit antenna. Phase windup causes the z axis 300 to be about 20 cm offset.

The inventors determined, however, that the present inventors could properly model the effects of phase windup. This model is incorporated in the improved GIPSY-OASIS II of the present invention.

The inventors found that this phase center mismodeling was not the only problem—the combination of the dynamic and kinematic mismodeling were responsible for the overall reduction in solution quality. The mismodeling during the shadow crossing and the post-shadow recovery period can last up to 90 minutes—more than 10% of the orbit period. Another common mismodeling, although less severe, takes place at the other side of the orbit, during the "noon turn". Most models do not realize the physical limit on the satellite's yaw rate, and yaw the satellite at the arbitrarily high rates that are required to keep its nominal orientation. In reality the satellite reaches its yaw rate limit about 5° from orbit noon. This will extend the duration of the noon turn for up to 30 minutes. Naturally, this problem appears only for beta angles smaller than 5°. It grows in significance as the beta angle approaches zero.

The present inventors found that the yaw attitude of the GPS satellites could become modelable if the ACS was biased by a small but fixed amount. The ACS has provisions to allow such a bias. Biasing the ACS means that the Sun sensor's signal is superposed with another signal (the bias) equivalent to an observed yaw error of 0.5° (the smallest bias possible). As a result, during periods when the Sun is observed, the satellite yaw attitude will be about 0.5° in error with respect to the nominal orientation—a negligible error. During shadow, this bias dominates the open loop noise and will yaw the satellite at full rate in a known direction. Upon shadow exit, the yaw attitude of the satellite can be calculated and the Sun recovery maneuver can also be modeled.

The inventors suggested this be done; and the US Air Force implemented this suggestion on Jun. 6, 1994. It went into effect on all Block II satellites (except for SVNs 14, 18 and 20). It also turned out that three satellites (SVNs 13, 23 and 24) have already had 0.5° yaw bias for unrelated reasons. By early 1995 all Block II satellites had the yaw bias implemented on them. Until September, 1995, the sign of the bias was changed by ground command twice a year such that it was kept opposite to the sign of the satellite's beta angle. This was found to shorten the Sun recovery time upon shadow exit. Later the present inventors realized that the operational overhead outweighs the benefits, and from Sep. 22, 1995, all GPS satellites possess a fixed yaw bias of +0.5°. This implies that the bias and the beta angle will have the same sign during half the year and the opposite sign during the other half.

A satellite with a biased ACS behaves as follows. Upon shadow entry it either reverses its natural yaw direction (if the sign of the yaw bias is opposite to that of the beta angle) or maintains its yaw direction (if the sign of the yaw bias is the same as that of the beta angle). It then spins up to its maximal yaw rate and keeps yawing at this rate until it exits from shadow. Upon shadow exit the satellite performs the optimal maneuver necessary to recover its nominal orientation. This means that it either maintains its yaw rate or reverses its yaw rate, whichever is quicker to recover its nominal attitude. The present invention models this behavior.

The present invention describes three models for compensating the yaw attitude of a GPS satellite. The first model is crude and fast, the second one is more precise but rather slow. The following results were obtained using the precise model, but all indications point to the crude model being sufficiently accurate.

The crude model has three parameters, the maximum yaw rate of the satellite, the maximal yaw acceleration, and the "spin-up" rate. This GIPSY-OASIS yaw model assumes the following. Upon shadow entry, the satellite either keeps or reverses its yaw direction, depending on the signs of the bias and the beta angle. The satellite spins-up as fast as possible subject to the two constraining parameters of the maximum yaw rate and the maximum yaw acceleration. Outside shadow, the satellite yaws to minimize the difference between the actual yaw angle and the nominal (desired) yaw angle as fast as possible, subject to the constraining parameters above. This model is implemented as a finite difference scheme where the yaw rate and yaw acceleration are represented by backward differences. The scheme is very stable and there are no practical limits on the step size. This model is accurate enough for representing the satellite's yaw attitude during shadow crossing but it is less accurate outside shadow because the yaw bias is not explicitly present in this model. A fixed yaw bias causes varying yaw errors depending on the relative geometry of the Sun, the satellite and the satellite's orbit. The actual yaw error will grow as the satellite approaches the noon turn.

Figure 4A:
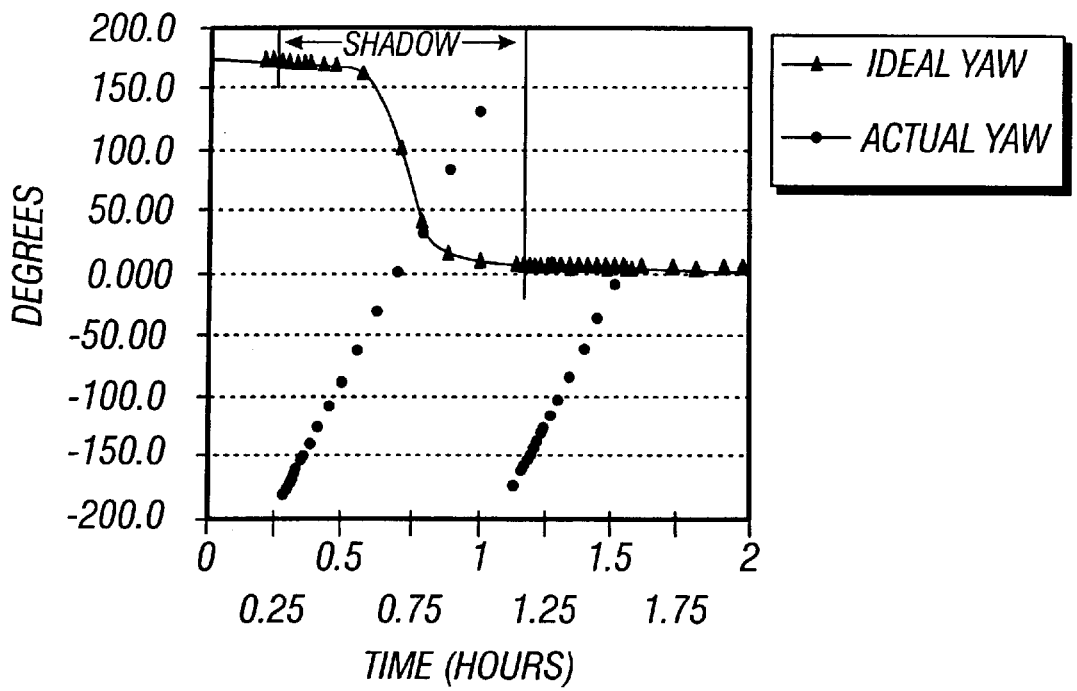
FIGS. 4a and 4b are charts with data to show two examples of midnight turn maneuvers with and without yaw rate reversal upon shadow exit.
Figure 4B:
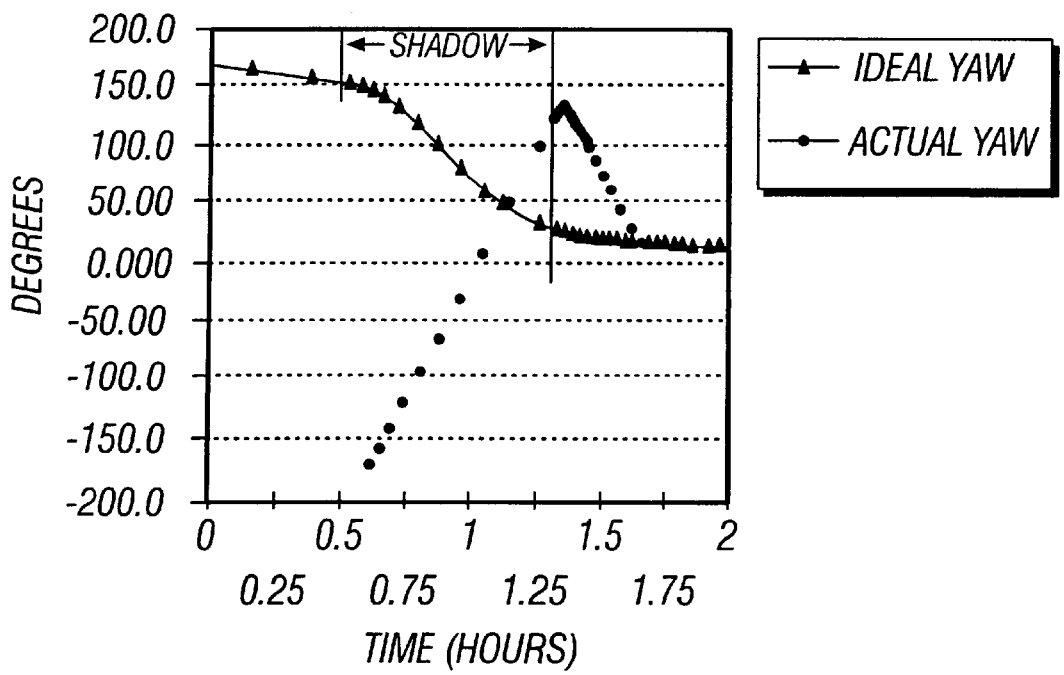

FIG. 4 shows two examples of midnight turn maneuvers. FIG. 4a is a case wherein yaw rate does not reverse upon exit. FIG. 4b is a case with yaw reversal upon exit. In both cases, yaw rate reversal upon shadow entry indicates that the sign of the yaw bias is opposite to that of the beta angle. The ideal yaw attitude is the nominal theoretical attitude if the sun would have been visible to the satellite.

A more precise model can be used to handle accurately the yaw attitude outside shadow, at the noon turn in particular.

Figure 5:
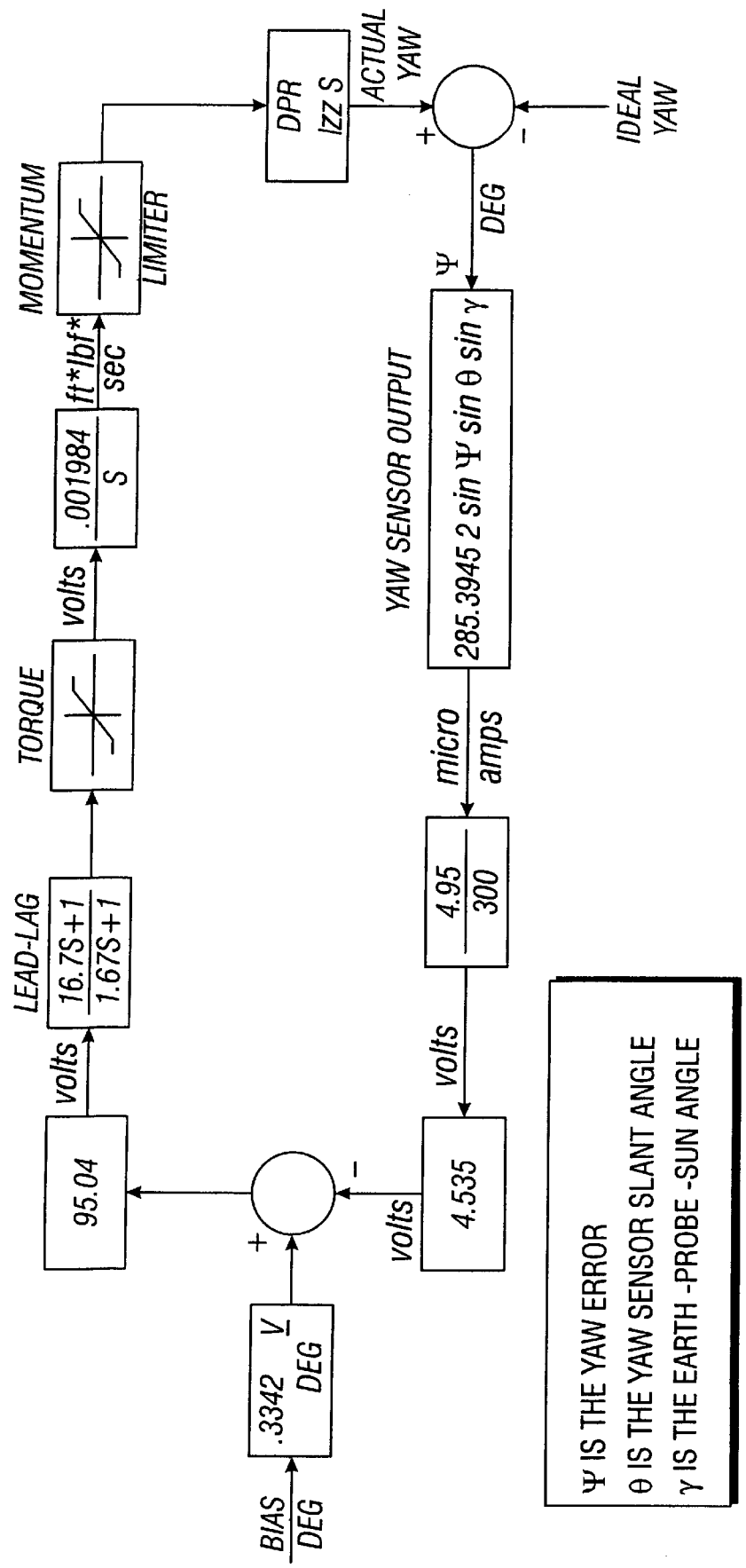
FIG. 5 is a block diagram of the precise numerical integration model for yaw attitude compensation in accordance with the present invention.

A block diagram of the yaw compensation model is shown in FIG. 5, which models the ACS bias on the satellite. This is an iteration process that minimizes the yaw error with respect to the ideal yaw. A small step size is desirable in order to maintain the numerical stability in this model.

The inventors found that modeling the ACS bias clears up many of the inaccuracies which previously existed. One problem remains, however. It turns out that no set of rate parameters fits all satellites. Furthermore, the value of the maximal yaw rate can change for a given satellite from one shadow crossing to the next and from shadow crossing to noon turn since the angular momentum stored in the reaction wheels upon shadow entry or at any other point in time cannot be predicted with sufficient accuracy. It depends on the instantaneous moments applied on the satellite as well as their history, and is also dependent on momentum dumping that is taking place occasionally. Also, every satellite is has a different yaw moment of inertia which changes slowly in time as the mass properties of the satellite change. Unavoidable errors in modeling the yaw attitude and the shadow boundaries contribute additional uncertainty. As a result, for precise applications, the present inventors-recognized a need to estimate the maximal yaw rate for each shadow event and for each noon turn for each specific satellite. Indeed, variations of up to 30% were observed in the estimated values of the maximal yaw rate between different satellites. This estimation requires high quality data in sufficient quantity about each satellite. The process would normally include determining, for each satellite, the maximum yaw amount and rate for that satellite in each particular maneuver being monitored.

The estimation problem is further complicated by the apparent non-linear dependence of the satellite's attitude on the yaw rate. There is always a yaw rate value such that if the satellite yaws faster, a yaw rate reversal will occur upon shadow exit, and if the satellite yaws slower a yaw rate reversal will not occur. In the vicinity of such a value a small estimation error will result in large modeling errors. One way to overcome this problem is to reject data from shadow exit until 30 minutes thereafter—the ambiguous period. Other techniques exist, like iterating on the solution or preprocessing the data to determine the direction of the yaw rate after shadow exit.

Figure 6A:
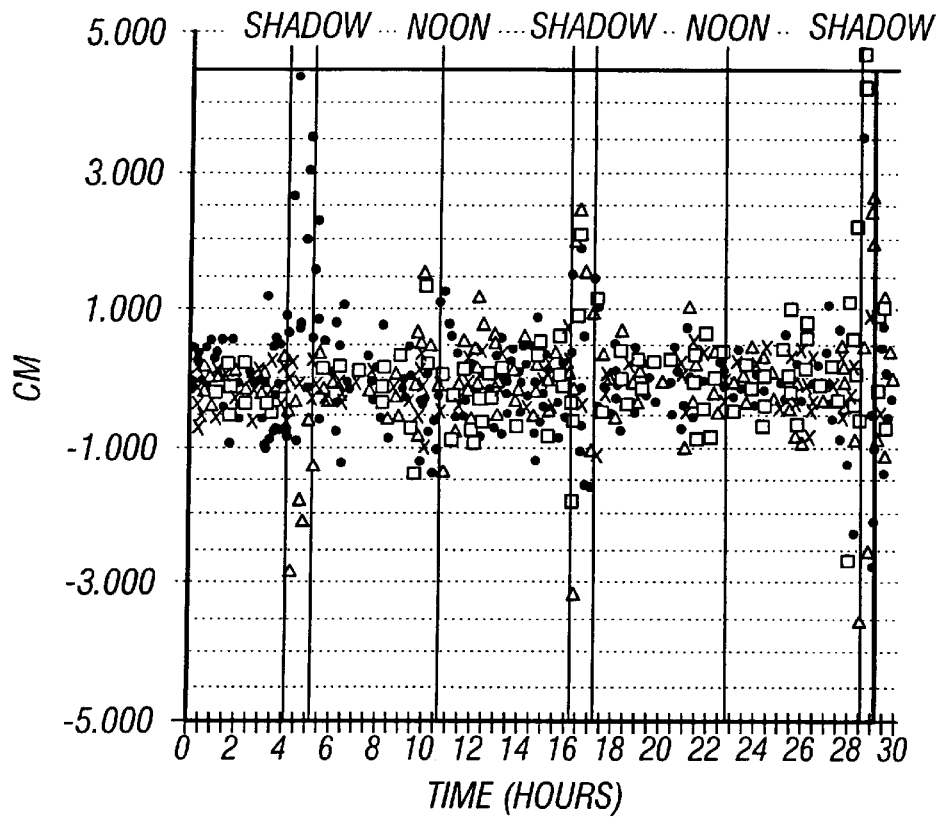
FIGS. 6a and 6b are charts showing the actual measurements of carrier phase post-fit residuals.
Figure 6B:
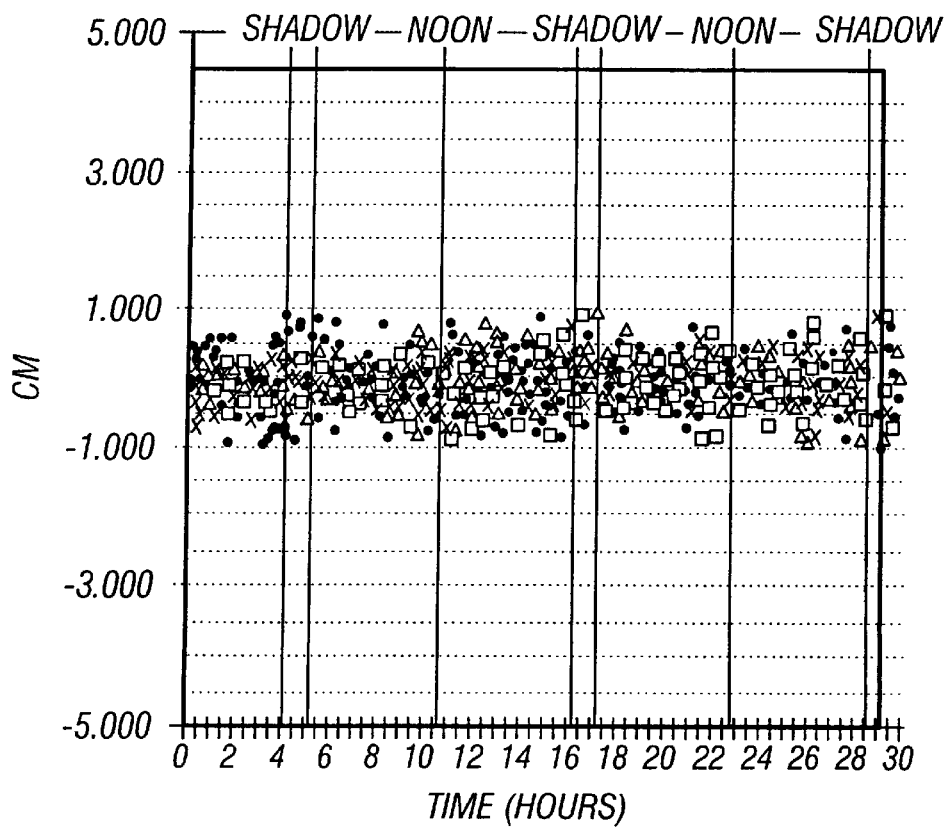
Figure 7A:
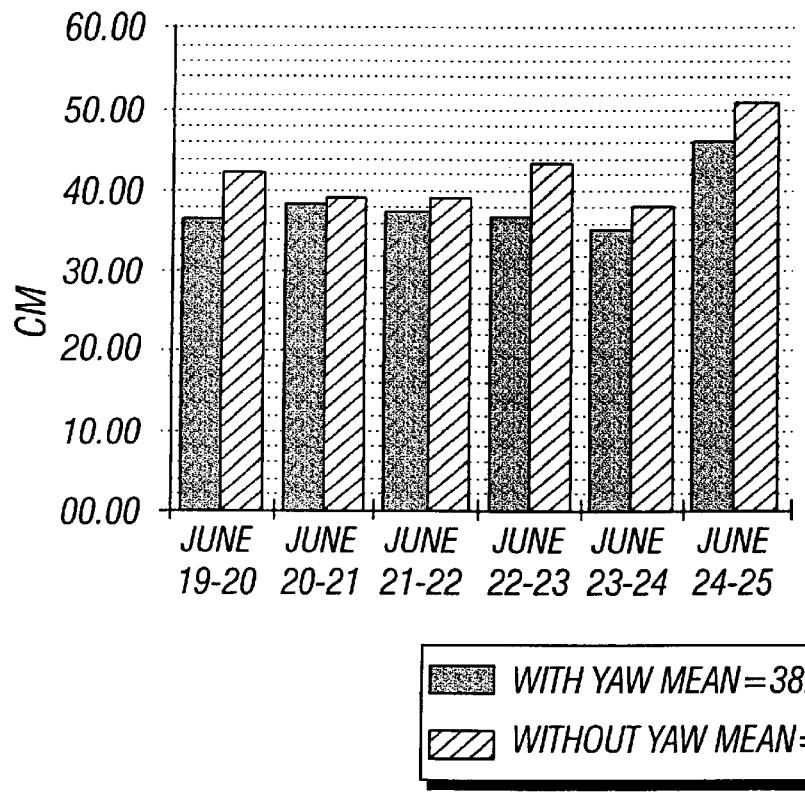
FIGS. 7a–7d are charts for comparing GPS orbit solutions in the JPL-daily process with and without the yaw compensation.
Figure 7B:
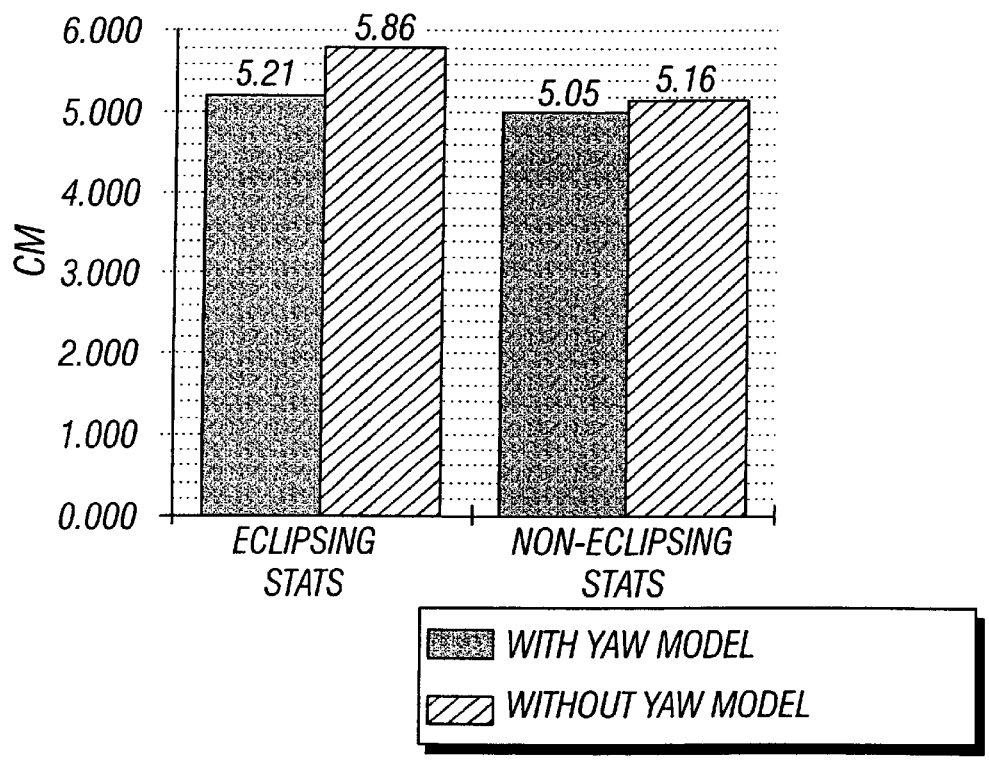
Figure 7C:
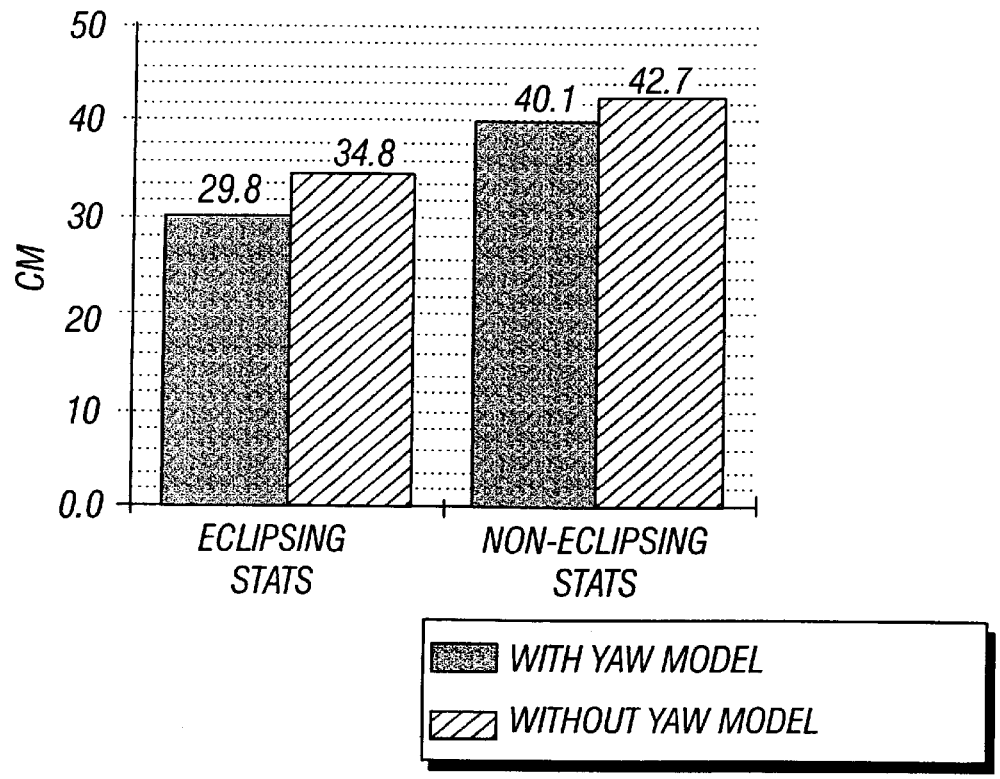
Figure 7D:
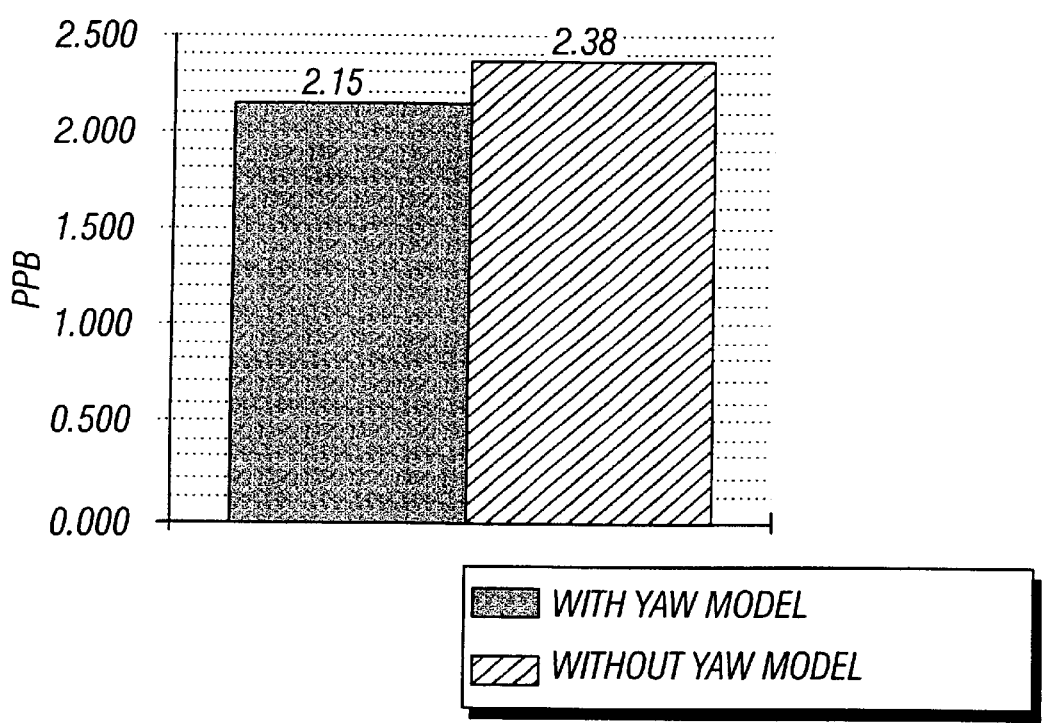

FIG. 6a illustrates carrier phase post-fit residuals of an eclipsing satellite (SVN 24) with all observing receivers. Large outlying residuals are seen to be strongly correlated with the events of the satellite going into shadow. This demonstrates the consequences of ignoring the actual attitude of the satellite and mismodeling the midnight turn as though it takes place at "midnight". FIG. 6b shows the results of the yaw compensation of the present invention. The new yaw attitude model is employed and yaw rates are estimated. The post-fit residuals improve significantly and the correlation between post-fit residuals and shadow events disappears.

FIG. 7 shows the results of yaw compensation of another satellite. FIG. 7a shows GPS daily overlaps. FIG. 7b shows weekly averages of post-fit residuals. FIG. 7c is the weekly averages of orbit overlaps. FIG. 7d is the baseline length repeatabilities, in parts per million.

Clearly, the present invention has solved the problem of random yawing during shadow crossing by adding yaw compensation to the attitude control subsystem of GPS satellites. The determinacy of the yaw attitude allows for proper modeling of the carrier phase and pseudorange signal during shadow crossing.

The two yaw compensation models described above rely on simulation of the behaviors of the hardware components that control the yawing of an earth-orbiting GPS satellite. These models can properly handle both the midnight maneuver and the noon maneuver by accounting for the yaw bias as well as the limit on the yaw rate. Since the models compute the satellite yaw angle through numerical integration of a control law at a small step size for stability, they will be referred as numerical integration models herein for convenience of identification. These numerical integration models generate a large output file having the yaw attitude history and, optionally, partial derivatives of the yaw attitude with respect to the yaw rate parameter. The output file could later be interpolated to retrieve a yaw angle at the requested time.

The inventors also devised a third embodiment for yaw compensation modeling. This embodiment adapts an analytical approach instead of numerical simulation as in the numerical integration models thereabove. The inventors developed a set of analytical formulas in this analytical model to describe the yaw attitude of a GPS satellite in each phase in the satellite orbit. Therefore, the yaw attitude at any location and time in the orbit can be approximately predicted by this analytical model. The accuracy of the analytical model is further improved by using the actual measurements from the on-board hardware components.

In the following sections, angle units, i.e., radians or degrees, will be implied by context. Radians will be usually used in formulas and degrees will be usually used in the text. In addition, FORTRAN function names are used whenever possible with the implied FORTRAN functionality, e.g., ATAN2(a,b) is used to denote arctangent(a/b) with the usual FORTRAN sign convention.

Nominal Attitude Regime

The realization of the two requirements for the satellite orientation mentioned above, yields the following formula for the nominal yaw angle:

$$\Psi = A\ TAN\ 2(-2\ \tan\ \beta, \sin\ \mu) + B(b, \beta, \mu), \quad (1)$$

where b is the beta angle, m is the orbit angle, both measured from orbit midnight in the direction of motion, b is the yaw bias inserted in the ACS, and B is the actual yaw angle induced by b. It follows from this formula that the sign of the yaw angle is always opposite that of the beta angle.

Ignoring the time variation of the slow-changing beta angle leads to the following formula for the yaw rate (there are simpler formulas but they contain removable singularities which are undesirable for computer codes):

$$\dot{\Psi}_n = \frac{\dot{\mu} \tan\beta \cos\mu}{\sin^2\mu + \tan^2\beta} + \dot{B}(b, \beta, \mu), \quad (2)$$

where m varies little in time and can safely be replaced by a constant 0.0083 degrees/second. Notice that the sign of the nominal yaw rate is the same as the sign of the beta angle in the vicinity of orbit midnight (m=0).

The singularity of these two formulas when b=0 and m=0, 180 is genuine and cannot be removed.

Yaw Bias

The yaw bias has its side effects. Outside the shadow it introduces yaw "errors" that are actually larger that 0.5. To fully understand this we have to describe the ACS hardware, which is beyond the scope of this paper. The underlying reason is that the output of the solar sensor is proportional not to the yaw error but to its sine, and it is also proportional to the sine of the Earth-Spacecraft-Sun angle, E. It turns out that in order to offset a bias of b degrees inserted in the ACS, the satellite has to actually yaw B degrees where B is given by:

$$B(b,\beta,\mu) = B(b,E) = \sin^{-1}(0.0175b/\sin E), \quad (3)$$

where 0.0175 is a hardware-dependent proportionality factor, E is the Earth-Spacecraft-Sun angle. The Earth-Spacecraft-Sun angle, E, the beta angle b, and the orbit angle m satisfy the following approximate relationship:

$$\cos E = \cos\beta\cos\mu, \quad (4)$$

where E is restricted to a range between 0 and 180 degrees. Formula (3) becomes singular for E less than 0.5013. This has no effect on the actual yaw because a small value of E implies that the spacecraft is in the middle of a midnight or noon maneuver and is already yawing at full rate. The actual yaw bias, B, becomes significant only for moderately low values of the Earth-Spacecraft-Sun angle, E. For example, for E=5 which is the typical value at the noon maneuver entry, the actual yaw bias is B≈6°. The bias will, therefore, affect the yaw attitude during the noon maneuver, but it will have little effect on the midnight maneuver which begins at E angles of around 13°, for which B≈2°.

The bias rate is given by:

$$\dot{B}(b,\beta,\mu) = -0.0175 \frac{b\ \cos E\ \cos\beta\dot{\mu}\sin\mu}{\cos B \sin^3 E}. \quad (5)$$

The ACS bias, b, can be ±0.5° or 0°. The inventors started setting the bias to +0.5° on all satellites for testing purpose in November 1995. Before that, with few exceptions to be discussed below, the bias was set to b=−SIGN(0.5, b) since this selection was found to expedite the Sun recovery time after shadow exit.

Shadow Crossing Regime

As soon as the Sun disappears from view, the yaw bias alone is steering the satellite. On some satellites the yaw bias has a sign opposite to that of the beta angle. To "correct" for the bias-induced error such a satellite has to reverse its yaw rate upon shadow entry. For those satellites with bias of equal sign to that of the beta angle there is no yaw reversal. The bias is large enough to cause the satellite to yaw at full rate until shadow exit when, finally, the bias can be compensated. The yaw angle during shadow crossing depends, therefore, on three parameters: The yaw angle upon shadow entry, $\Psi_i$, the corresponding yaw rate, and the maximal yaw rate, R. Let $t_i$ be the time of shadow entry, $t_e$ be the time of shadow exit, and let t be the current time and define:

$$t_1 = (SIGN(R,b) - \dot{\Psi}_i)/SIGN(RR,b), \quad (6)$$

to be the spin-up/down time. Then the yaw angle during shadow crossing, Ψ, is given by:

$$\Psi = \Psi_i + \dot{\Psi}_i(t-t_i) + 0.5 SIGN(RR,b)\ (t-t_i)^2, \quad (7a)$$

for $t < t_i + t_1$, and $$\Psi = \Psi_i + \dot{\Psi}_i t_1 + 0.5 SIGN(RR,b) t_1^2 + SIGN(R,b)\ (t-t_i-t_1), \quad (7b)$$

for $t_e > t > t_i + t_1$. RR is the rate of the maximal yaw rate R, or yaw acceleration. Using these formulas, the singularity problem of the nominal attitude at midnight is avoided.

Post-Shadow Maneuver

The post-shadow maneuver is the most delicate part of the yaw attitude model. The post-shadow maneuver depends critically upon the yaw angle at shadow exit. The ACS is designed to reacquire the Sun in the fastest way possible. Upon shadow exit the ACS has two options: one is to continue yawing at the same rate until the nominal attitude is resumed, or second, to reverse the yaw rate and yaw at full rate until the nominal attitude is resumed. In this model we assume that the decision is based on the difference between the actual yaw angle and the nominal yaw angle upon shadow exit and we denote this difference by D. If te is the shadow exit time then:

$$D=\Psi_n(t_e)-\Psi(t_e)-\text{NINT}((\Psi_n(t_e)-\Psi(t_e))/360)360, \tag{8}$$

and the yaw rate during the post-shadow maneuver will be SIGN (R,D).

Given the yaw angle upon shadow exit, the yaw rate upon shadow exit, SIGN(R,b), and the yaw rate during the post-shadow maneuver, we can compute the actual yaw angle during the post-shadow maneuver by using formula (7) with the appropriate substitutions. This yields:

$$t_1=(\text{SIGN}(R,D)-\text{SIGN}(R,b))\text{SIGN}(RR,D) \tag{9}$$

$$\Psi=\Psi(t_e)+\text{SIGN}(R,b)(t-t_e)+0.5\text{SIGN}(RR,D)(t-t_e)^2, \tag{10a}$$

for $t<t_e+t_1$, and $$\Psi=\Psi(t_e)+\text{SIGN}(R,b)t_1+0.5\text{SIGN}(RR,D)t_1^2+SIGN(R,D)(t-t_e-t_1), \tag{10b}$$

for $t_n>t>t_e+t_1$, where $t_n$ is the end time of the post-shadow maneuver. The post-shadow maneuver ends when the actual yaw attitude, derived from formula (10), becomes equal to the nominal yaw attitude. In this analytical model, $t_n$ is determined by an iterative process that brackets the root of the equation $\Psi(t)=\Psi_n(t)$, where the time dependence of $\Psi_n(t)$ is introduced by substituting $m=m_e+0.0083(t-t_e)$ in formula (1). This equation can be solved as soon as the satellite emerges from shadow. Once the time of resuming nominal yaw is reached we switch back to that regime.

Noon Maneuver Regime

The noon maneuver regime starts in the vicinity of orbit noon, when the nominal yaw rate reaches its maximal allowed value and ends when the actual yaw attitude catches up with the nominal regime. First we have to identify the starting point and this can be done by finding the root, $t_n$, of the equation $\Psi_n(t)=-\text{SIGN}(R, b)$, where $\Psi_n(t)$ is the nominal yaw rate from formula (2). After the start of the noon maneuver the yaw angle is governed by formula (7), again, with the proper substitutions. This yields:

$$\Psi=\Psi_n(t_n)-\text{SIGN}(R,\beta)(t-t_n). \tag{11}$$

The end time is found by the same procedure that is used to find the end time of the post-shadow maneuver.

Complete Model

Satellite position and velocity, as well as the timing of shadow crossings are required inputs to the analytical model in accordance with the present invention. The model is able to bootstrap, though, if these input values are unavailable far enough into the past. For example, if the satellite is potentially in the post-shadow regime upon first query, there is a need to know the shadow entry time so that all the inputs to formulas (9) and (10) are known. If this shadow entry time is missing from the input, the model can compute it approximately as well as the shadow exit time. Once all the timing information is available, yaw angle queries can be made at arbitrary time points. The model will determine the relevant yaw regime and compute the yaw angle using the correct formula. Given the above formulas it is an easy matter to compute the partial derivatives of the yaw angle with respect to any parameter of the problem, the most important of which is the maximal yaw rate, R.

Figure 8:
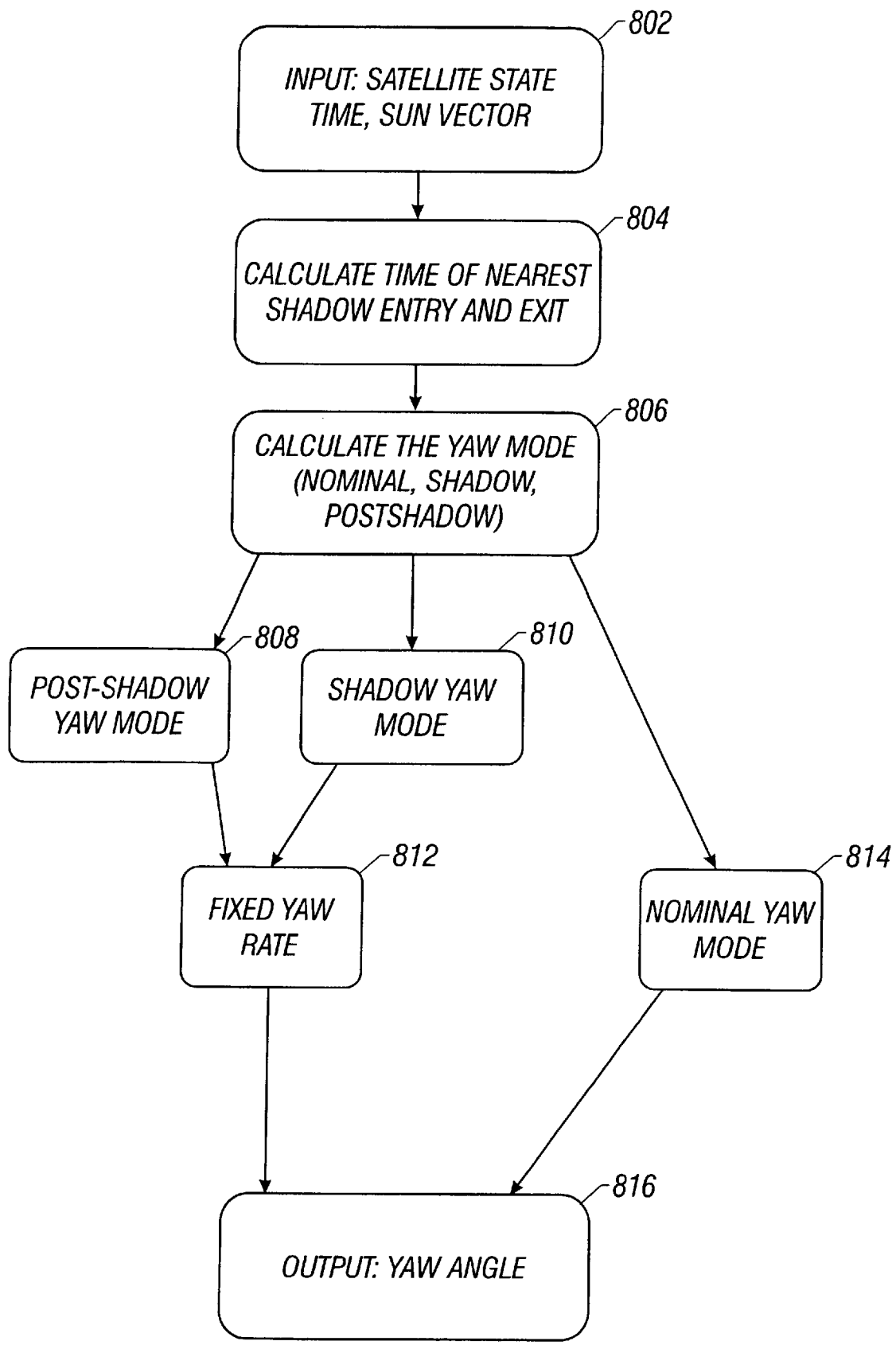
FIG. 8 is a flowchart showing the operational flow of the analytical model for yaw compensation in accordance with the present invention.
Figure 9A:
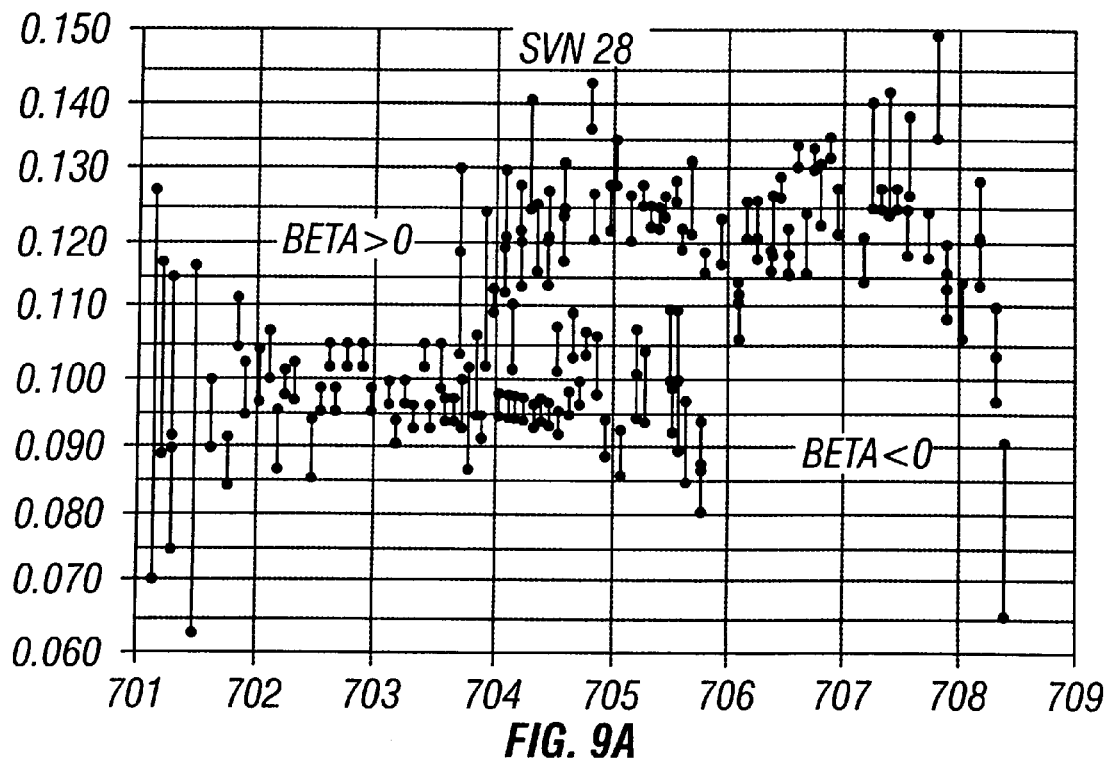
FIGS. 9a–9h are charts showing the estimated yaw rates (deg/sec) with their formal errors (s) vs. GPS week. SVNs 28, 31, 36, 37 are coplanar in the C-plane and SVNs 18, 26, 29 and 32 are coplanar in the F-plane.
Figure 9B:
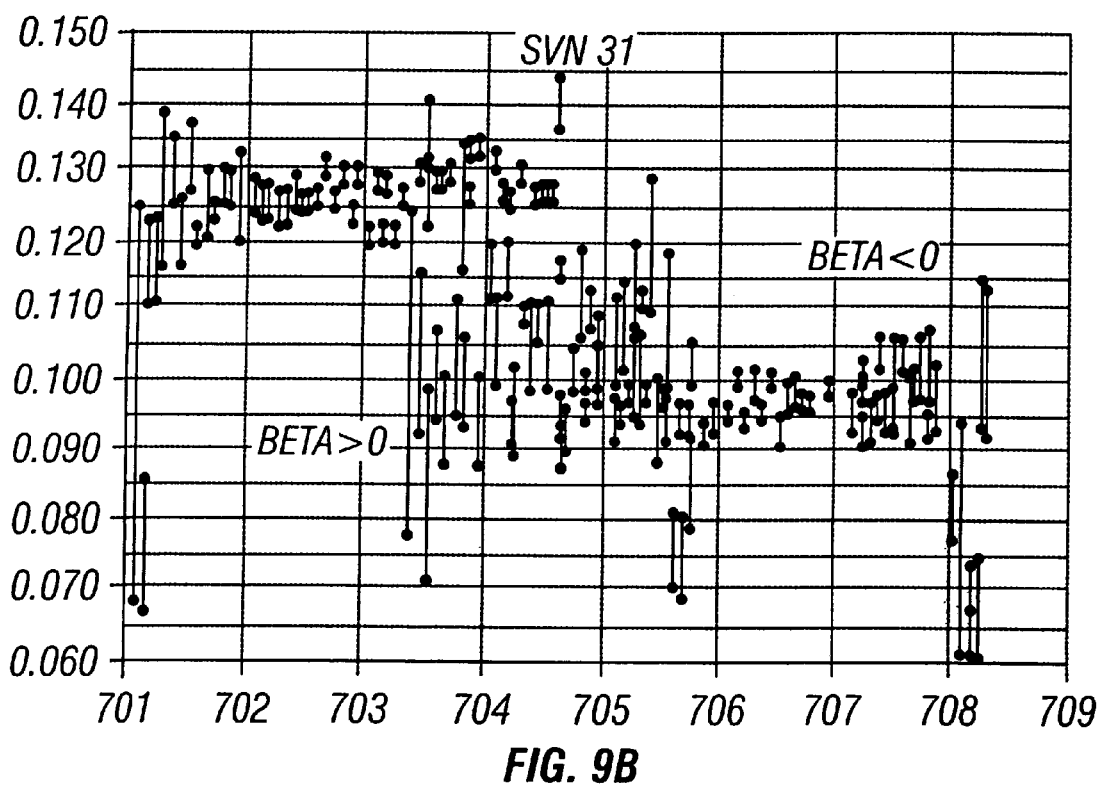
Figure 9C:
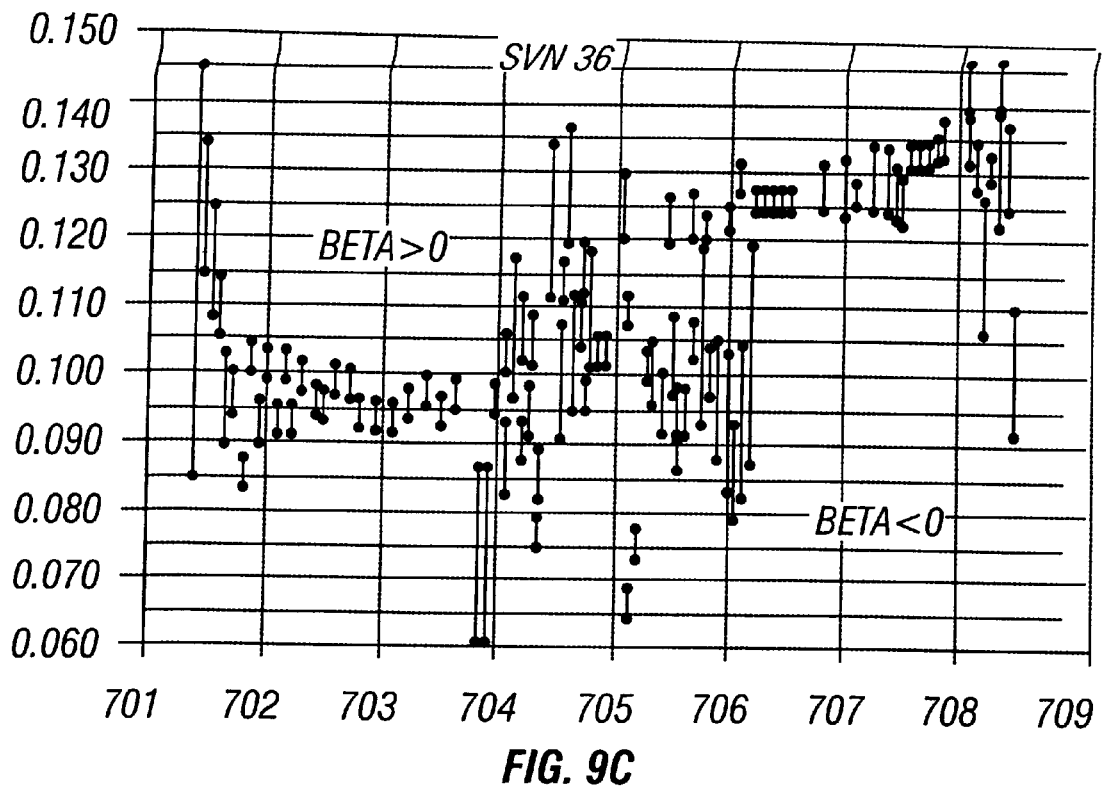
Figure 9D:
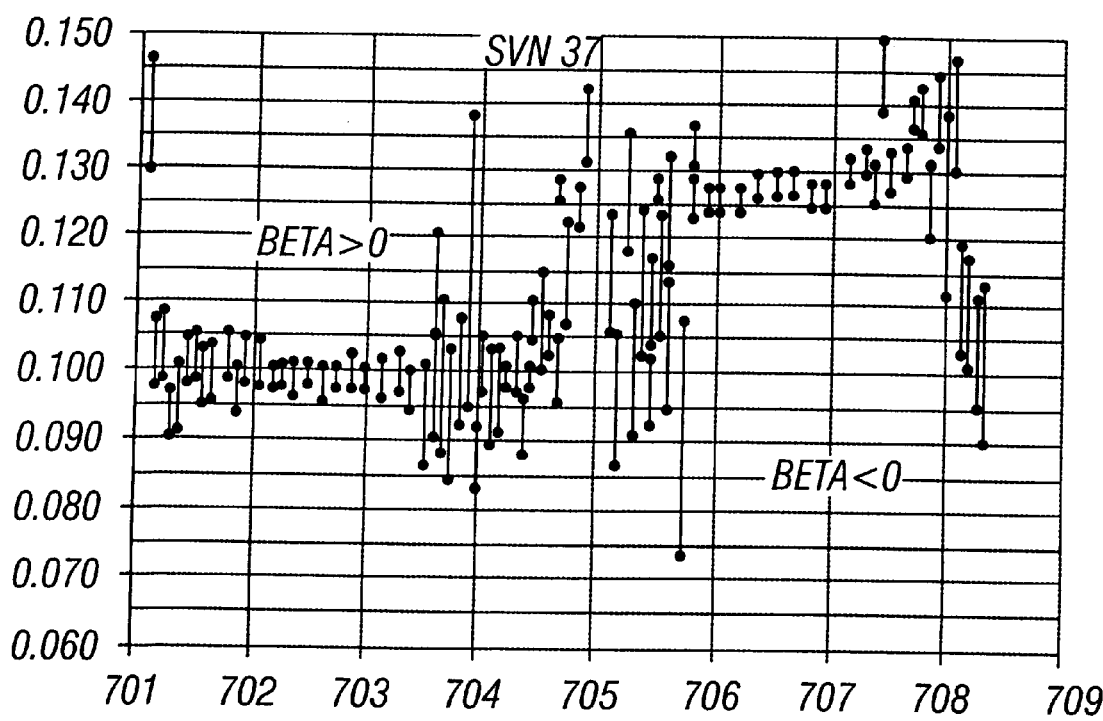
Figure 9E:
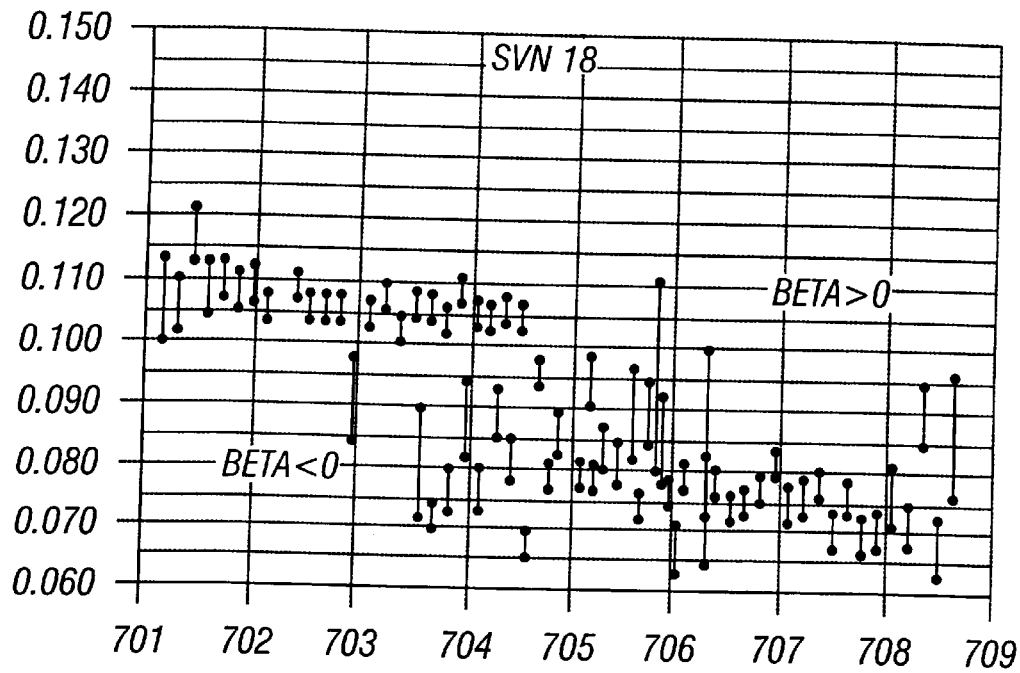
Figure 9F:
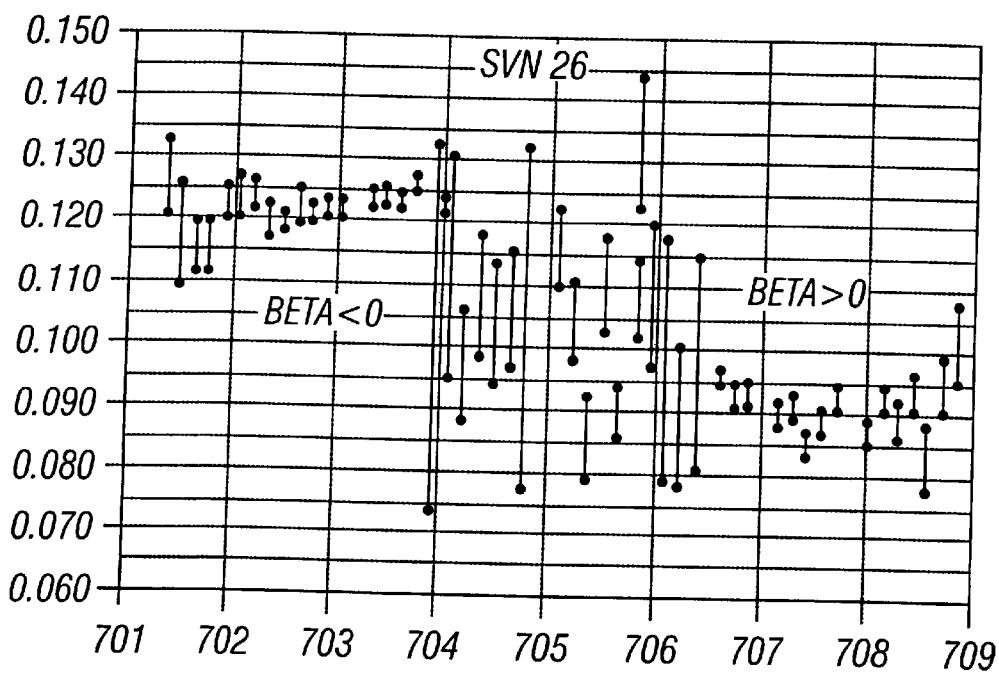
Figure 9G:
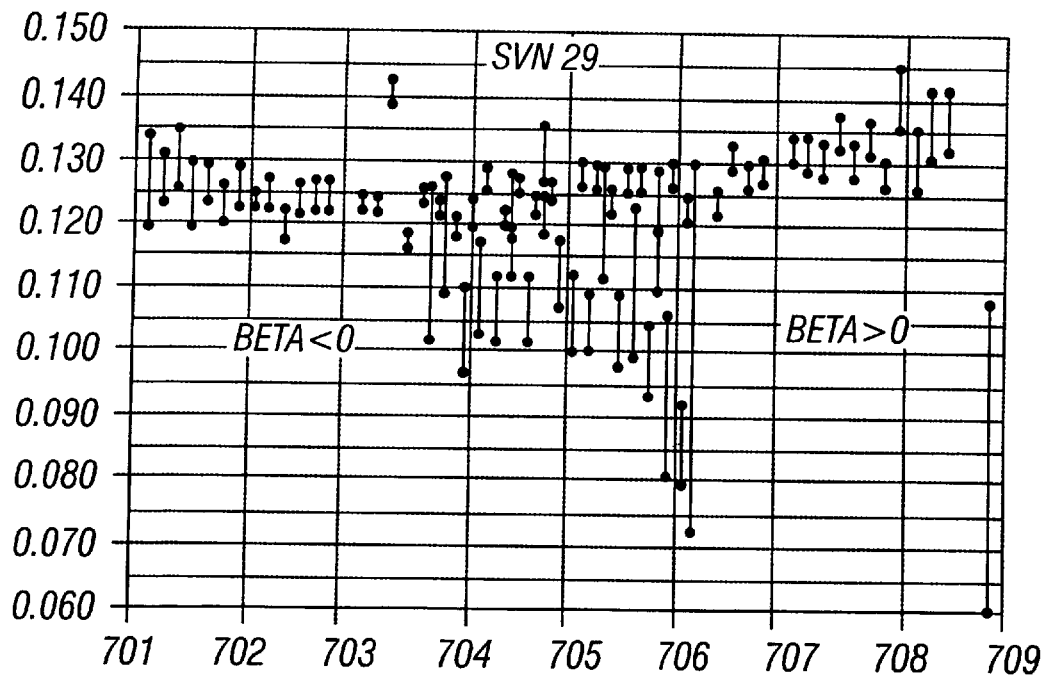
Figure 9H:
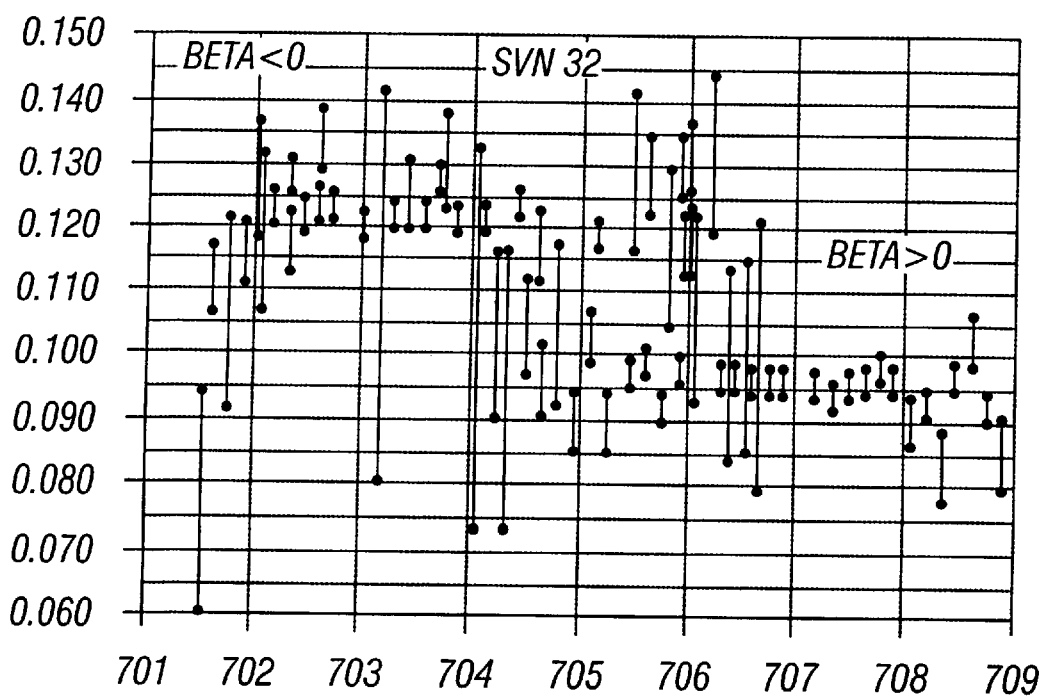

FIG. 8 shows the operational flow of this analytical model for yaw compensation.

Model Fidelity

The fidelity of the model is a measure of how accurately it describes the true behavior of the satellite. This is hard to measure because there is no high quality telemetry from the satellite and because the estimated value of the main model parameter, namely, the yaw rate, depends on many other factors besides the attitude model itself: data, estimation strategy and other models for the orbit and the radiometric measurements. Nevertheless, some conservative evaluation of the accuracy of the this analytical model is possible, based on experience accumulated with the use of this model and its predecessor, the precise numerical integration model.

The nominal attitude regime is believed to be very accurate. The only source of error is mispointing of the satellite which is poorly understood and relatively small (of the order of 1 around the pitch, yaw and roll axes). Compensations for the dynamic effect of this error source were discussed by Kuang et al. (1995) and Beutler et al. (1994) where it was treated, properly, within the context of the solar pressure model.

Modeling the midnight maneuver accurately is difficult. Inherent uncertainties such as the exact shadow entry and exit time are persistent error sources. Inaccuracies in shadow entry time are more important than inaccuracies in shadow exit time because errors in the former are propagated by the model throughout the midnight maneuver. In contrast, error in the shadow exit time will affect the post-shadow maneuver only. Either way, the inaccuracy will be manifested through a constant error in the yaw angle, which can be partially compensated through the estimation of the yaw rate. The length of the penumbra region is usually about 60 seconds. Sometime during this period the yaw bias begins to dominate the signal from the solar sensor. GYM95 puts that time midway into the penumbra. The maximum timing error is, therefore, less than 30 seconds. A worst-case scenario, ignoring the short spin-up/down period and using a yaw rate of 0.13 degrees/second, will give rise to a constant yaw error of approximately 4 degrees throughout the midnight maneuver. A more realistic estimate is 3°, even before applying yaw rate compensation, after which the RMS error will remain the same but the mean is expected to vanish.

Another error source is the uncertainty in the value of the maximal yaw rate, RR. This parameter is weakly observable and therefore difficult to estimate. The nominal value for RR that is used in the analytical model is 0.00165 degrees/sec² for Block IIA satellites and 0.0018 for Block II. The uncertainty in those values should to be less than 30%. The long-term effects of a yaw rate error can be computed from the second part of Formula (7) to be:

$$\Psi(RR) = \frac{\Psi_i SIGN(R, b) - 0.5\Psi_i^2 - 0.5 SIGN(R, b)^2}{SIGN(RR, b)}. \tag{12}$$

A worst-case scenario assuming the yaw rate upon shadow entry is $-\text{SIGN}(R,b)=0.13$ and 30% error in the yaw rate would give rise to a yaw error of about 5. These assumptions also imply a very short shadow duration, guaranteeing that the error will not be long-lasting. For long shadow events the yaw rate upon shadow entry is nearly zero and the resulting yaw error is about 1. Again, this error can be partially offset by estimating the yaw rate.

The main error source for the noon maneuver is the timing uncertainty of the onset of the maneuver. This uncertainty is not expected to be larger than two minutes. A timing error of two minutes will cause a constant yaw error of about 15, assuming a yaw rate of 0.13 deg/sec. The relatively short duration of the noon maneuver diminishes somewhat the effects of such a large error. Estimating the yaw rate will decrease the error further.

The yaw rate, R, is the key parameter in the model. Since it is time-integrated, a small error in R will cause a yaw error which is growing in time. For example, an error of 0.01/sec, which is typically less than 10% of the value of R, will give rise to a 30 error in yaw at the end of a 50-minute shadow event. Therefore, great care should be exercised in choosing values for the yaw rates or, alternatively, they should be estimated. Estimated yaw rates available from JPL (see below) are believed to be accurate to better than 0.002/sec (1 s) based on their formal errors.

Although unlikely, errors from different sources can augment. The maximal error for each regime is as follows: 2 for the nominal yaw regime, 9 for the midnight maneuver regime, and 15 for the noon maneuver regime. Typical errors are expected to be less than half these values.

Operational Aspects of Analytical Model

Continuous changes in the implementation of the yaw bias in the ACS of GPS satellites and occasional hardware problems require appropriate adjustments to the yaw attitude model. This section reviews the changes in the GPS constellation affecting the yaw attitude since the initial implementation of the yaw bias on Jun. 6, 1994.

Initially, the yaw bias was inserted into all GPS satellites except those with a reaction wheel failure (SVNs 14, 18 and 20 at the time). SVN 10 does not allow for a yaw bias. On Jan. 9, 1995, a reaction wheel failure on SVN 16 forced the GPS operators to switch off its yaw bias. Then, on Jan. 31 of 1995 the Air Force agreed to extend the implementation of the yaw bias to the satellites with a reaction wheel failure and the implementation was carried out a week later. Currently, all 24 operational satellites are yaw biased. The four satellites with reaction wheel failure cannot yaw at the same rate as a healthy satellite and their yaw rate is about 23% smaller.

The yaw bias can be set positive or negative. It can be shown that if the sign of the yaw bias is opposite that of the beta angle, the Sun reacquisition time after is shadow exit is minimized. For this reason the US Air Force had routinely switched the sign of the yaw bias in a satellite whenever the beta angle crossed zero, such that b=−SIGN(0.5, b). Due to operational constraints it was impossible to carry out this switch exactly when b=0 and it was actually carried out within 24 hours of the beta angle sign change. Unexplained anomalies in the estimated yaw rates (see below) that were correlated with the bias sign switch led us to request that the Air Force stop switching the bias sign. The request was granted on an experimental basis and, gradually, from September 1995 to November 1995 the yaw bias on all GPS satellites was set to +0.5 and it remained unchanged ever since. As a result, the above-mentioned anomalies disappeared, making the yaw rates much more predictable and, essentially, removing the need to estimate them.

Estimated Yaw Rates

As part of the implementation of the GYM models at JPL the yaw rates of all eclipsing satellites are estimated for every midnight maneuver and every noon maneuver. In JPL's GIPSY software this is done by treating the yaw rate as a piecewise constant parameter for each satellite. The parameter value is allowed to change twice per revolution, mid-way between noon and midnight. FIG. 9 depicts the estimated yaw rates for each eclipsing satellite, for each midnight maneuver and for each noon maneuver, from Feb. 16 to Apr. 26, 1995. The accuracy of the estimates depends on the amount of data available during each maneuver and this, in turn, is proportional to the duration of the maneuver. The longer the maneuver the better the estimate. The effect of a reduced estimation accuracy during short maneuvers is mitigated by the fact that the resulting yaw error is also proportional to the duration of the maneuver. For long maneuvers, e.g., midnight maneuver at the middle of eclipse season, the estimates are accurate to 0.002/sec, which leads to a maximal yaw error of about 6. A similar error level is expected for short maneuvers. Noon maneuvers occur only during the middle part of the eclipse season. In FIG. 9 they can be distinguished from midnight maneuver rates by the larger formal errors associated with them, since they are typically short events of 15 to 30 minutes duration. As a result, the scatter of the noon maneuver rates is larger than that of the midnight maneuver rates. Toward the edges of the eclipse season the quality of the yaw rate estimates drops, again because of the short duration of the shadow events.

An important feature in FIG. 9 is the discontinuity of the estimated yaw rates in the middle of eclipse season, corresponding to the beta angle crossing zero. No plausible explanation is currently available for this jump. SVN 29 is the only satellite that does not have a jump discontinuity; this is also the only satellite that does not undergo a bias switch in the middle of eclipse season. SVN 31 is the only satellite with a jump from high yaw rates to low yaw rates as the beta angle transitions from positive the negative. The ratio of the high yaw rate values to the low yaw rate, values is about 1.3 for all satellites. Within each half of the eclipse season the midnight yaw rates are fairly constant, varying by 10% or less. This behavior was found to be 100% correlated with the event of the yaw bias sign switch, taking place around the time the beta angle crosses zero. After November 1995, when the yaw bias was set permanently to +0.5, no discontinuities were observed.

The noon maneuver yaw rates seem to be more variable than the midnight maneuver rates. This is not only a consequence of the weak observability but also of the fact that the spacecraft is subject to a varying level of external torque during the noon maneuver as the eclipse seasons progresses. Nevertheless, JPL will continue to estimate the yaw rates for every midnight maneuver and for every shadow maneuver in order to maintain the highest accuracy and in order to monitor the system.

The modeling of the post-shadow maneuver is a problem for which a satisfactory solution has not yet been found. The source of the problem is the presence of the post-shadow regime which makes the estimation of the yaw rate into a nonlinear problem. There is always a critical value of the yaw rate such that for higher values the spacecraft will reverse its yaw upon shadow exit and for lower values the spacecraft will retain its yaw rate until the end of the midnight maneuver. If this critical value falls in the range of feasible yaw rates—which it often does—it becomes very difficult to determine the kind of maneuver taking place upon shadow exit. To avoid this post-shadow ambiguity we have been rejecting measurement data from shadow exit until about 30 minutes thereafter.

Filtering and Smoothing

The filter/smoother module of GOA II is mechanized as a Kalman-type square-root information filter (SRIF) with a factorized UDU smoother. A smoother is necessary in combining data from both before and after the time of interest to produce the optimal estimate for a time-varying parameter. In GOA II, such time-varying parameters include orbital states, atmospheric delays, certain biases, and clock parameters. The smoother also enables correct calculation of the post-fit data residuals, which in turn are used to identify outliers and exclude bad data.

The filter/smoother has a multitude of special features which make it an extremely powerful tool for analysis of satellite tracking data, particularly GPS-data. These features include: (1) capability to add process noise to any parameter; (2) capability to specify multiple different process noise models for any parameter; (3) capability to model a parameter as both a process noise and as a constant parameter in the same run to represent different components of its behavior or effects; (4) capability to vary the process noise batch interval for each process noise parameter; (5) capability to perform a full range of error assessment analyses including covariance studies, consider analysis, simulations, and the capability to perform UDU smoothing of the sensitivity, which adds a unique error analysis capability; (6) computation of residual sum of squares after smoothing; (7) capability to remove "nuisance" white noise parameters from the run, which saves on CPU time and disk space when running the filter and smoother; (8) capability to change the priori uncertainty on bias parameters before smoothing, which saves tremendous amounts of processing when the analyst needs to test different combinations of "fixed" ground station coordinates; and (9) capability to model the troposphere (atmospheric) signal delays with multiple parameters, each with azimuth ranges specified.

The use of factorized algorithms for both filtering and smoothing ensures numerical stability. The algorithms used are optimized for speed. The filter/smoother has been used for data processing from many GPS and non-GPS satellites from low-Earth to geostationary orbit. Typically JPL estimates precise GPS orbits with more than 100,000 GPS measurements/day from dozens of ground sites in an automated sequence on small UNIX work stations, with more than 25,000 parameters estimated each day. These data are used to produce the most accurate GPS orbits available, accurate to 10–30 cm. The filter/smoother itself has several layers of automated and rigorous data quality tests which identify questionable data after both the filter and smoother have finished and then automatically correct or exclude (downdate) the questionable data one at a time. The algorithm requires a tiny fraction of the CPU time which would be normally required to re-run an entire data set with the bad measurements removed. In addition, GOA II can be programmed to automatically iterate several times through this process.

Another important feature of GIPSY-OASIS II is its ability to discard certain parameters when smoothing the data. Those parameters whose final values are not of interest but whole effects must be included in the least squares estimation could number in the hundreds in GPS analysis. The "nuisance parameter" discard option can save significant disc, memory, and processing usage. This feature is especially useful in large filter runs, e.g. those having greater than 300 parameters, with recurring white noise stochastic processes. The operation uses a stochastic smoothing step followed by a deterministic step. Only parameters of interest to the analyst are retained if this option is selected; certain bias or clock estimates, if not needed, are not saved. This reduces file, memory, and CPU usage by a factor of 4 or more.

Most filters of this type, including the filtering algorithm used by GIPSY-OASIS II, need to use a Kalman or factorized Kalman mechanization. G. J. Bierman described factorized filters in 1977, and most filters of this type are based on Bierman's work. One problem with Bierman's smoother algorithm is use of the full covariance matrix in performing calculations. This is known to be numerically unstable.

The present invention implements a more stable approach using the UDU covariance factors instead of the full covariance matrix. In particular, the present invention uses special techniques to provide a unique smoothed UDU sensitivity matrix for unestimated parameters representing systematic effects. This sensitivity-smoothing capability allows users of GIPSY-OASIS II to evaluate certain systematic errors' effects on stochastically varying parameters (relating to satellites, the atmosphere, etc.) This is the first time the appropriate algorithms have been worked out and implemented in precise tracking software for satellite orbit analysis.

One important aspect of the filter/smoother in the improved GOA II of the present invention is the capability of automatically, day after day without human interaction, cycling through new data sets from remote sites to estimate ultra-precise orbital parameters to an accuracy of a few tens of centimeters for GPS satellites and for low-Earth orbiters such as TOPEX. This is accomplished through a combination of the filter/smoother software itself plus a complex series of executive UNIX shell scripts.

Another important aspect of the present invention is the new ambiguity resolution algorithm that is integrated in the portion of the improved GOA II known as the "SMAPPER". This piece of GOA II performs the UD smoothing of the terminal SRIF array. That is, the smoothing coefficients generated from the forward Kalman SRIF filter are applied in succession to generate piece-wise constant estimates and covariance. The appropriate piece-wise constant solutions of the spacecraft state and any dynamic parameters can then be "mapped" in time to produce continuous and smoothed time-varying estimates and covariance of the spacecraft states.

More specifically, the "SMAPPER" module combines multiple functions to increase the efficiency and utilization of system resources. Some of the combined functions include: (1) the smoother; (2) the mapper (used to map and propagate satellite orbits and covariances); and (3) the ambiguity resolution module. The ambiguity module resolves the integer-multiple carrier phase ambiguities to extract the utmost accuracy for the solutions. For ambiguities which are not resolved, the filter/smoother is used to estimate a bias parameter for each station-satellite tracking pass. For each phase ambiguity that can be resolved, an estimated parameter can be eliminated and solution accuracy increases noticeably. Even when only about 40% of the ambiguities can be resolved, orbit accuracies improve from about 15 cm to about 10 cm.

The result of combining these three programs into one is that calculations can be carried out efficiently to reduce the amount of time needed, the memory needed, and the disk space needed for a solution. When smoothing and mapping are done separately, as in other GPS processing system, enormous covariance files must be written and saved to storage (e.g., a disk). This becomes unnecessary by implementing "SMAPPER" in accordance with the invention. The resolving of the phase ambiguities is something which is not routinely done in other GPS processing systems because this process usually requires careful attention of an analyst and considerable computer resources. However, because the improved GIPSY-OASIS II of the invention integrates the ambiguity resolution into the SMAPPER module, resolving of the phase ambiguities becomes fully automated. Therefore, resolving of the phase ambiguities can be implemented even on automated routine data processing. This results in higher accuracy for solution, at a low cost for the processing.

In previously released GOA I software, the mapping of the spacecraft state was implemented as a separate process from the smoother. After each dynamic smoothing step, large UD arrays would have been saved to file. The GOA I mapper would then read this file and determine the appropriate UD array to map. Similarly, the GOA I version of ambiguity resolution required reading its covariance from files. For a global solution, several hundred phase bias parameters would be estimated. It was often the case that if phase bias parameters were not overlapping (in time), since they would be less correlated, their double-difference integers could not be determined. Generating all possible double-difference candidate pairs was unnecessary and time consuming. By incorporating this function into the smoothing process, the double-difference candidates were more likely to be fixed since they would now be overlapping and more correlated. Also, since we are recycling phase bias estimate states in the filter (when there is a new phase break), the size of the UD array being worked upon is smaller, hence the computation required is much less.

To resolve the integer N1–N2 ambiguities, either 1.) a widelane code method, if there are P code receivers, 2.) a widelane ionosphere approach, if there is sufficient ionosphere cancellation for short baselines, or 3.) a searching technique is employed. To resolve the narrowlane ambiguity, the smoothed double-difference bias estimates are computed. These linear combinations are described in "Carrier Phase Ambiguity Resolution for the Global Positioning System Applied to Geodetic Baselines up to 2000 km", Journal of Geophysical Research, vol. 94, no. B8, Aug. 10, 1989, by Geoffrey Blewitt.

After the smoothing process has finished, the fixed ambiguities are written to a file as double-difference data equations. These equations are then applied as constraint equations (with a large data weight), to the smoothing coefficients and terminal SRIF array.

High Clock Rate Solutions for Precise Positioning

As previously described, the accuracy of information that is available from GPS satellites has been intentionally degraded. Various techniques have been used to calculate and interpolate information to compensate or correct for this degradation.

Determination of location using GPS requires certain necessary information including the location of the GPS satellite and their clock offsets, both as a function of time. Such information is digitally encoded in the signal transmitted by the satellite and is usually referred as broadcast ephemeris. A GPS receiver on the ground or in an earth-orbiting satellite can decode the broadcast ephemeris and measure the ranges to the in-view transmitting satellites. Such a GPS receiver can further determine its position in three dimensions with an accuracy largely dependent on the accuracy of the quantities in the broadcast ephemeris.

The GPS dither algorithm, called Selective Availability (SA), degrades the accuracy of the broadcast emphemeris by GPS. This causes the GPS clock solutions to look like white noise on short time scales with a standard deviation of about 80 nanoseconds or 24 meters.

Analysis of data from a global network of GPS receivers can yield estimates of GPS positions and clock corrections that are at least a factor of 10 more accurate than the broadcast ephemeris. Although not necessarily available in real time, these estimates can be used in a post-processing mode to analyze the data some time after its collection for obtaining much improved accuracy in positioning. However, such global analysis is computationally expensive and requires hours of CPU processing or small workstations to analyze a day's worth of measurements spaced every five minutes from thirty GPS receivers distributed globally with each receiver typically measuring six to ten GPS satellites. Although the current global network of receivers acquires data every thirty seconds, the analysis of all such data is generally not computationally feasible on small workstations. Thus only one-tenth of the data, i.e., every five minutes, must be actually analyzed to produce precise GPS satellite positions and clocks.

Knowledge of satellite positions every five minutes can be interpolated with a high degree of accuracy to yield positions at intermediate times. This is possible because the motion of the GPS satellites varies with time in a smooth way that is dictated by Newton's laws. The GPS clock corrections, on the other hand, are not smooth on time scales of minutes, mainly due to the rapid and large variations by the GPS dither algorithm or Selective Availability (SA). Thus interpolation of clock estimates results in intermediate estimates that are several orders of magnitude worse in accuracy than that for positions, if the values interpolated are spaced every 5 min.

One aspect of the present invention is the capability of producing high-clock rate estimates for an improved accuracy at 30s or more frequent clock rate (e.g., 10s). In the present invention, some of the GPS receivers in the global network are equipped with a frequency reference such that these receiver clocks are smooth relative to each other. For data corresponding to this subset of receivers, only the satellite clocks do not vary in a smooth way with time. Therefore, higher rate estimates of a given satellite's clock can be made asking what value of the clock is consistent at each measurement time with the ranges to that satellite as measured by each of the receivers. All other parameters are fixed or interpolated from their values as determined in the original global solution. Thus the only unknown is the satellite clock.

A detailed description of achieving high-clock rate with at least a 30 second interval in accordance with the present invention is as follows. It should be noted that higher clock rate solutions are in general preferred to increase the accuracy. The 30-second example described herein is intended only as an example.

The classical GPS "point positioning" refers to the processing of data from one receiver to estimate the parameters for that receiver: position and clock. The global parameters, however, e.g. GPS orbits, clocks and Earth orientation remain constant in this type of processing. Fixed global parameters, there is no coupling of data from one site to the other, and data from one receiver can be analyzed without regard to data from any other receiver. One advantage of this scheme includes efficient processing of the data.

For processing purposes, the present inventors assume that in a global network, receiver-specific parameters, in particular, the ground receiver location, troposphere delay, and phase biases are estimated in advance and temporally smooth. First such network data are processed at a 5-min rate; one can then analyze GPS data, one satellite at a time, at the full rate of the data—30 s in the case of the present global network—and estimate satellite clocks at the high rate. This method requires only very slightly more computer time than needed for 5-min type processing; but the 30-sec estimates it produces are provided in about one-hundredth the computer time needed to process the whole network at 30-sec rate.

The solution of this embodiment constructs a global network of receivers, each of which has a smooth clock solution. Measurement files are formed for each GPS receiver. These data are analyzed independently. All global network receiver parameters (e.g., troposphere, location, clocks, and phase-biases) are fixed at their values determined in the global network analysis, and presumed to be interpolable from 5 minutes to 30 seconds, or more frequently. Satellite positions are fixed at their values determined in the global network analysis. Data specific to one GPS satellite are analyzed to determine high-rate GPS clocks and phase-bias parameters for that satellite. This requires approximately 5 min of CPU time on an HP 735 for each satellite when data at 30-second rate from a ground network of 9 receivers are processed.

Figure 10:
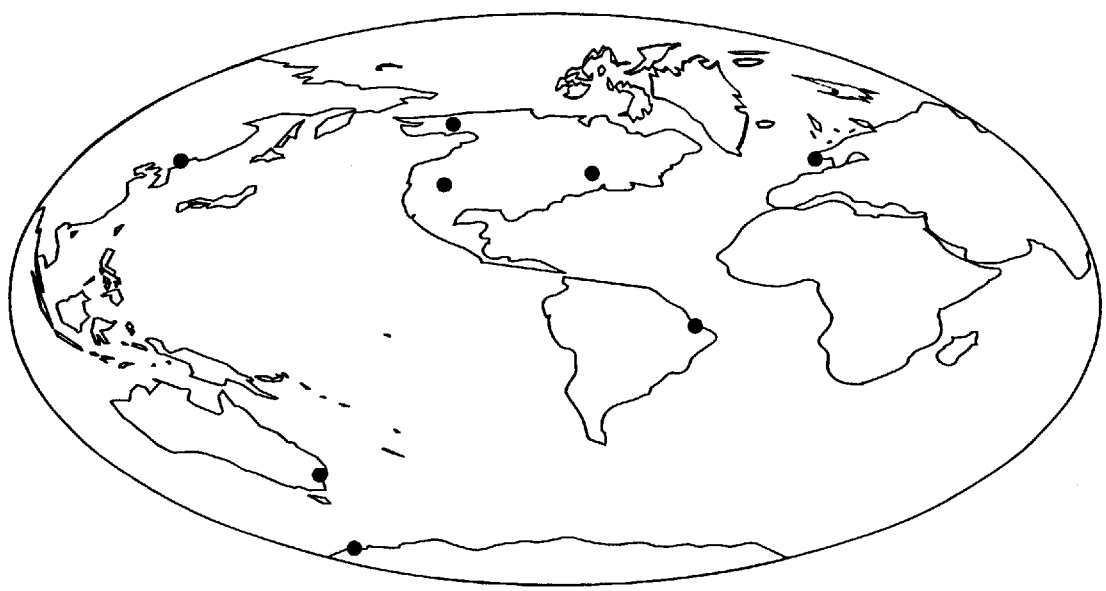
FIG. 10 is a schematic illustrating the ground network of nine sites used in the present invention for generating high-rate clocks.

The preferred embodiment of the invention chooses the following nine sites as indicated in FIG. 10: Algonquin Park, Canada (ALGO); Casey, Antarctica (CAS1); Fairbanks, AK (FAI2), Fortaleza, Brazil (FORT); Kokee Park, HI (KOK2); Onsala, Sweden (ONSA); Pietown, NM (PIE1); Tidbinbilla, Australia (TID2); and Usuda, Japan (USUD). Except for Casey and Usuda, receivers at all of these sites use extremely stable hydrogen masers for time reference. To allow for the noisier clocks at Casey and Usuda, the present inventors assign 5-cm noise to their phase measurements, as opposed to 1 cm for the other sites.

Figure 11:
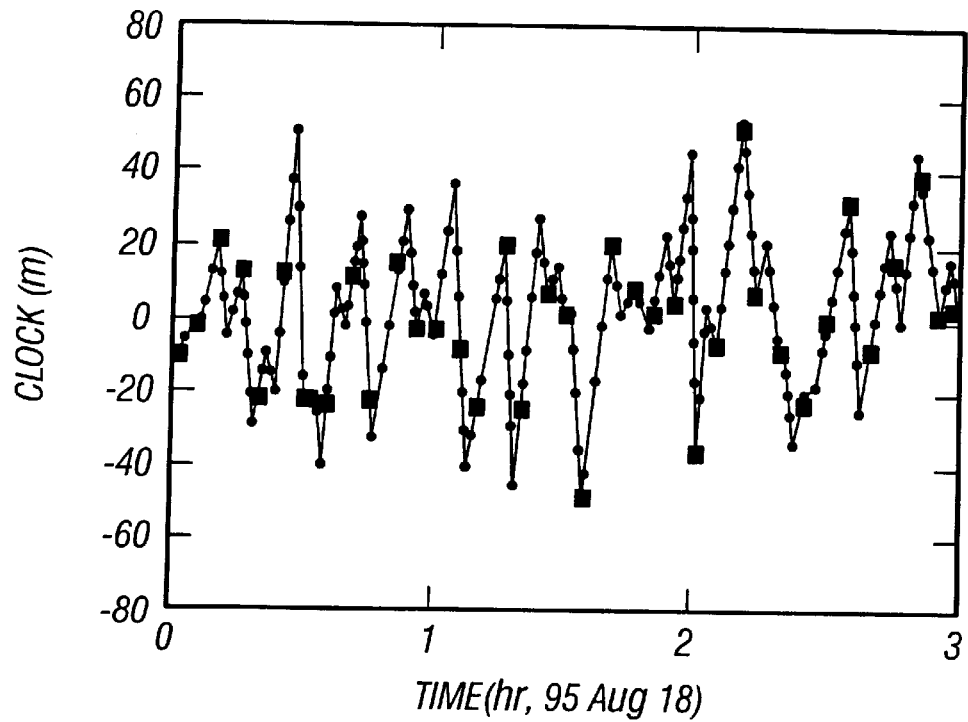
FIG. 11 is a chart to show high-rate clock solution at 30-second intervals and regular global network solution at 5-minute intervals.

An example of the results is shown in FIG. 11. The large solid squares give the solution at 5-min intervals, while the small open circles with connecting lines show the 30 second solution. The oscillations in the 30-second solution occur with a period of about 7 minutes and an amplitude of about 24 m rms. The inventors found that 5 min was not frequent enough to track the sinusoid-like oscillations that occur with a period of about 7 minutes.

The technique described thereabove relies on a global network of sites with interpolable clocks. From FIG. 10 it is clear that there are regions where such clocks are lacking. Additionally, it would be advantageous to have the same network acquire data at a 10-s rate, so that GPS clocks at 10-s intervals could be determined. At that frequency, the interpolation error from SA is reduced to the few-mm level.

A chronological process uses precise GPS orbits and clocks at 5-min intervals produced by Flinn to analyze data from every site automatically. Because sites with smooth clock solutions are necessary for the determination of high-rate GPS clocks, the present inventors need to determine which sites have such solutions.

Figure 12:
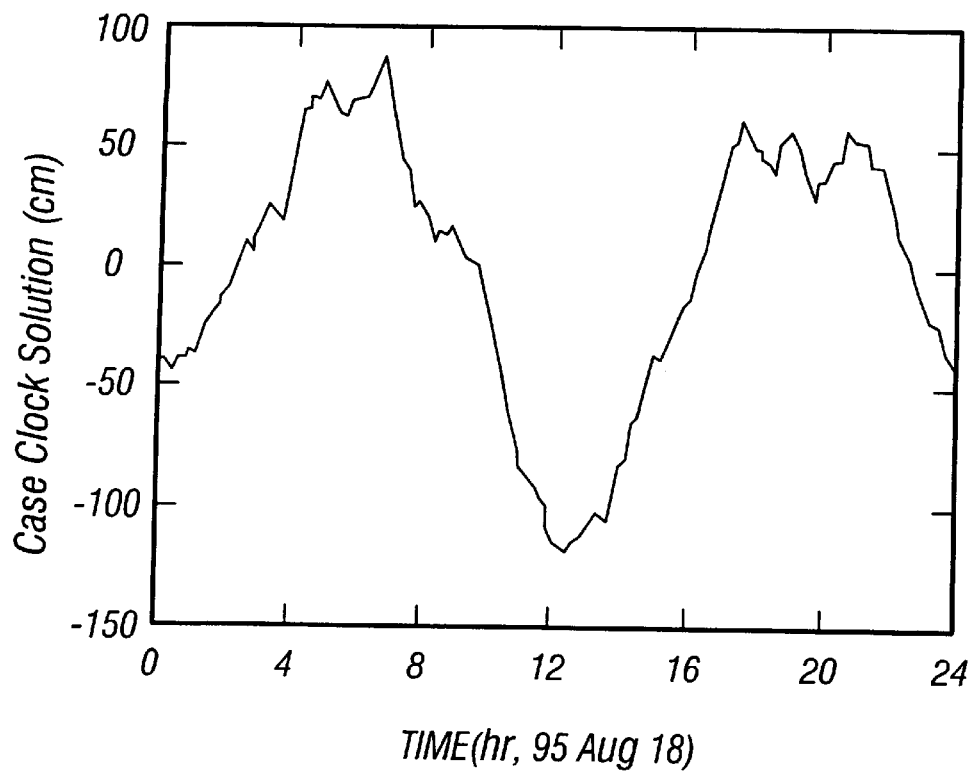
FIG. 12 is a chart showing the de-trended clock solution of GPS receiver at Casey, Antarctica from precise point positioning using regular global network analysis products.

As an example, shown in FIG. 12 is a plot of the de-trended point-position clock solution for Casey, Antarctica. The rms over the day is 56 cm or 1.87 ns. Before trend removal, the slope is 5.03 km/day (16.8 us/day). A simple measure of smoothness is to compare the solution at each point with the average of the solution at adjacent points. The rms variation over the day $\delta$ in the difference quantifies the smoothness for the clock on the day. For Casey on Aug 18, the result is $\delta$=2.3 cm.

For each station on each day during the period Aug 3–sep 1, 1995, a similar calculation was done. On any of these days, a site is considered for further analysis if (1) it had at least 250 out of 288 (the number of 5-min intervals in 24 h) good clock solutions and (2) $\delta$ for the day was less than 100 m. A site will not have a good clock solution at times when outlier data are rejected and/or there are insufficient satellites in view.

Table 1 shows the result of the sites with the smooth clock solutions. The measurements were taken between Aug. 3 to Sep. 1 of 1995. The column labeled "days" indicates the number of days the site met the two criteria described thereabove. D is the rms value of d over such days in both cm and nsec.

The site at Algonquin Park, Ontario (ALGO) was used as the reference clock in the Flinn solution, which had an artificially low smoothness. TurboRogue GPS receivers, initially developed at JPL, were used except those labeled. The frequency standard was hydrogen maser unless indicated otherwise. Since ALGO was generally the reference clock for the parent solution that generated precise GPS orbits and clocks, its quality is artificially low. Except for the site at Goddard (GGAO) where the an external factor affected the clock, there is a clear difference in the smoothness of clocks from maser-driven receivers as compared to those with cesium or rubidium references. The maser solutions are smooth at the level of 10–20 psec, while the Rb and Cs solutions are smooth to 60–300 psec.

TABLE 1

Quality of Clocks in Global GPS Network

| SITE | | DAYS | Δ (cm) | (psec) |
|---|---|---|---|---|
| ALGO | | 21 | 0.05 | 2 |
| WEST | | 19 | 0.32 | 11 |
| PIE1 | | 21 | 0.33 | 11 |
| NLIB | | 21 | 0.34 | 11 |
| GOLD[a] | | 17 | 0.35 | 12 |
| ONSA | | 18 | 0.36 | 12 |
| METS | | 21 | 0.38 | 13 |
| FAI2 | | 21 | 0.39 | 13 |
| MADR[a] | | 21 | 0.39 | 13 |
| NYAL | | 14 | 0.39 | 13 |
| YELL | | 21 | 0.40 | 13 |
| MATE | | 13 | 0.42 | 14 |
| FORT | | 19 | 0.44 | 15 |
| KOKB[a] | | 20 | 0.44 | 15 |
| MDVO[b] | | 10 | 0.44 | 15 |
| SANT[a] | | 14 | 0.47 | 16 |
| KOK2 | | 12 | 0.51 | 17 |
| WETB | | 17 | 0.51 | 17 |
| TID2 | | 20 | 0.53 | 18 |
| TIDB[a] | | 19 | 0.54 | 18 |
| FAIR | | 16 | 0.59 | 20 |
| BRUS | | 19 | 0.71 | 24 |
| KOSG | Rb | 21 | 1.70 | 57 |
| CAS1 | Rb | 21 | 2.63 | 88 |
| MDO1 | Cs | 19 | 2.80 | 93 |
| TROM | Rb | 14 | 2.81 | 94 |
| GRAZ | Cs | 20 | 3.13 | 104 |
| USUD | Cs | 20 | 3.13 | 104 |
| STJO | Rb | 21 | 3.24 | 108 |
| PENT | Cs | 20 | 3.45 | 115 |
| TSKB | Cs | 21 | 4.68 | 156 |
| VILL | Cs | 21 | 4.76 | 159 |
| GGAO | | 20 | 4.91 | 164 |
| KIRU | Cs | 21 | 6.25 | 208 |
| HART[a] | Rb | 15 | 6.81 | 227 |
| QUIN | Cs | 21 | 7.53 | 251 |
| PERT | Cs | 15 | 9.09 | 303 |

[a]Old Rogue
[b]Trimble

No-Fiducial Approach

Figure 13:
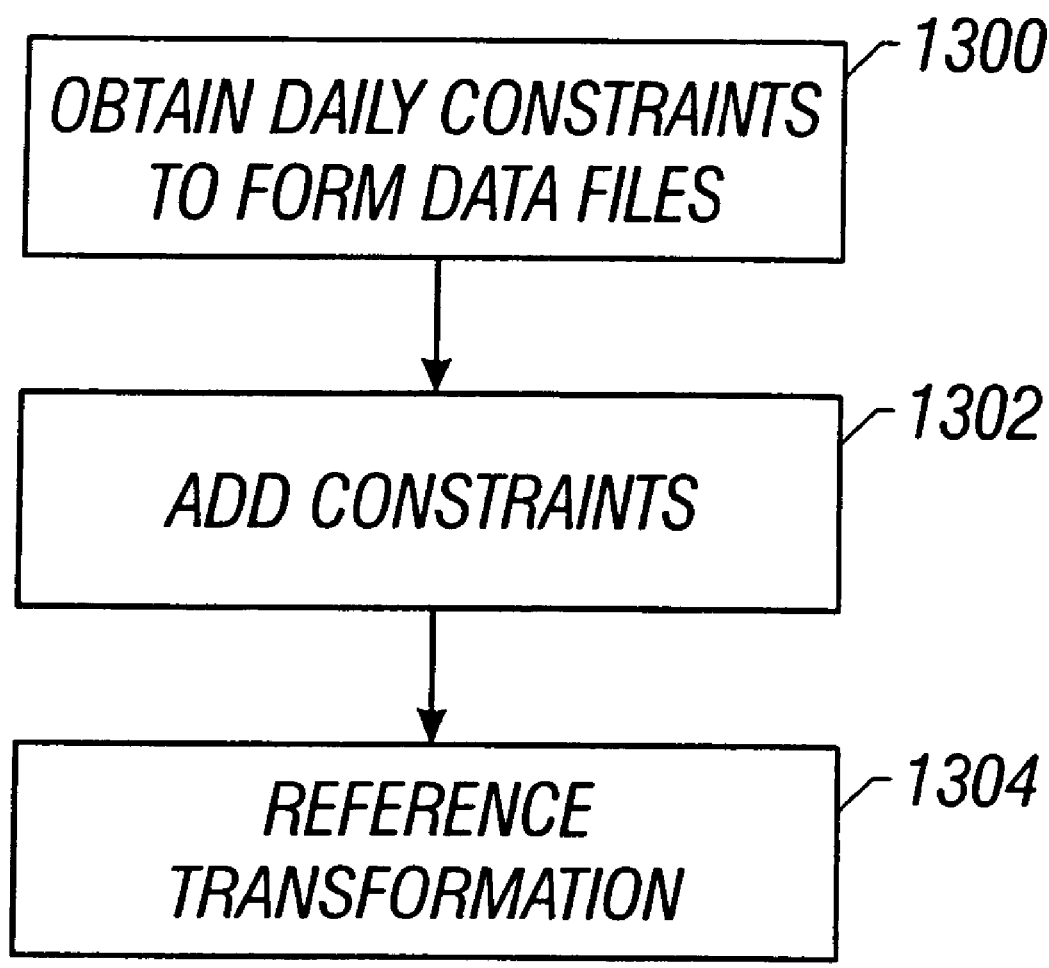
FIG. 13 is a flowchart to show the operation of the non-fiducial approach in accordance with the invention.

Another improved aspect of the present invention is called the generalized no-fiducial approach. This approach has been developed to obtain global ground positions and velocities without fixing any individual position or velocity components. The method can be applied to any global geodetic technique and proceeds in three general steps as shown in FIG. 13.

At 1300, daily solutions derived with weak constraints are combined to yield one global set of positions and velocities.

Minimal constraints are applied to remove uncertainties due to the loosely-defined reference frame at step 1302. At step 1304, transformation from one reference frame to another is accomplished with a 14-parameter transformation as described herein.

Additional information relevant to the invention can be found, for example, in "Global Coordinates with Centimeter Accuracy in the International Terrestrial Reference Frame using the Global Positioning System", by Blewitt et al., Geophys. Res. Lett., vol. 19, No. 9, pages 853–856, 1992, and "Global Geodesy Using GPS without Fiducial Sites", by Heflin et al., Geophys. Res. Lett., vol. 19, No. 2, pages 131–134, 1992. The disclosure of the above two references are incorporated herein by reference.

A terrestrial reference frame has an origin a unit of measurement and orientations for the x, y and z measurement axes. These reference frame parameters may be defined arbitrarily. The origin is usually chosen to be the Earth's center of mass. The z-axis approximately points in the direction of the north pole; the x-axis points toward Greenwich England and the y-axis is orthogonal to the other two axes in a right-handed sense. Addition of velocities allows each of the seven reference frame parameters to have rates; increasing the total number from 7 to 14.

The fiducial approach defines a reference frame by fixing some number of site positions and velocities. However, the present inventors noted that the fiducial approach has two potential drawbacks: first, it often provides more information than necessary. Fixing three site positions, for example, fixes the origin at a point which may not be at the center of mass and fixes three baseline lengths to values which may not be correct. Another problem is from site specificity. Data outages at the fiducial sites can make the reference frame consistency hard to maintain.

The present invention teaches an alternative no-fiducial approach. Given n sites, the n(n−1)/2 baseline lengths and n geocentric radii can be used to construct a polyhedron with its origin at the center of mass. The no-fiducial approach uses minimal constraints which are applied to the entire polyhedron. An improvement of the present invention includes generalization of this operation to include site velocities.

(1) Combining Daily Solutions

Daily solutions derived with weak constraints are combined to yield one global set of positions and velocities at some time to. Tho velocity model can be written as $$\begin{pmatrix} X_1 \\ V_1 \end{pmatrix} = \begin{pmatrix} I & (t_1 - t_0)I \\ 0 & I \end{pmatrix} \begin{pmatrix} X_0 \\ V_0 \end{pmatrix} \quad (15)$$

where $X_1$ and $V_1$ are vectors having measured positions and velocities for many sites at time $t_1$ and $X_o$ and $V_o$ are vectors containing estimated positions and velocities for those same sites at time $t_o$. Including velocities in the position vectors a measurement noise v yields $$X_1 = PX_0 + v \quad (16)$$

where P denotes the matrix in Equation (15). Equation (16) has least-square solutions given by $$X_c = (C_0^{-1} + P^T C_1^{-1} P)^{-1}(C_0^{-1} X_o + P^T C_1^{-1} X_1) \quad (17)$$

and a covariance matrix as $$C_c = (C_0^{-1} + P^T C_1^{-1} P)^{-1} \quad (18)$$

All solutions may be combined by applying the above equations iteratively.

(2) Applying Minimal Constraints

Minimal constraints are applied after the daily solutions have been combined. These constraints define a reference frame using the minimum amount of required information. Minimal constraints have been discussed by Vanicok and Krakiwsky in The Concepts of Geodesy, pp. 381, Elsevier Science Publishers, 1986 and others but have not been widely used because truly global data sets have only recently become available. A similar but not identical algorithm called orthogonal projection has been described by Koch in parameter Estimation and Hypothesis Testing in Linear Models, p.222, Springer-Verlag, New York, 1987. Here the minimal constraint is improved. Initially, the system is generalized to constrain 14 parameters corresponding to three rotations, three translations, one scale, and the corresponding rates thereof. Also, small but finite constraints are applied so that the final matrix is fully invertible. Matrix A as defined in the next section is constructed from the elements of $X_c$ and used to compute the following matrix:

$$B = (A^T A)^{-1} A^T \quad (19)$$

The final constrained covariance matrix is computed from the combined covariance matrix using:

$$C_x^{-1} = C_c^{-1} + B^T C_\theta^{-1} B \quad (20)$$

This matrix is inverted to yield:

$$C_x = C_c - C_c B^T (B C_c B^T + C_\theta)^{-1} B C_c \quad (21)$$

An important feature is the $C_\theta$ matrix which is chosen to be diagonal with small but finite variances for each of the 14 parameters so that the constrained covariance matrix is invertible. Minimal constraints affect only the covariance matrix leaving the estimates unchanged.

(3) Transforming between Different Reference Frames

Transformation from one reference frame to another is traditionally performed with 7 parameters as shown in the following transformation from (X, Y, Z) to (x, y, z):

$$\begin{pmatrix} x \\ y \\ z \end{pmatrix} = \begin{pmatrix} T_x \\ T_y \\ T_z \end{pmatrix} + \begin{pmatrix} 1+S & -\theta_z & \theta_y \\ \theta_z & 1+S & -\theta_x \\ -\theta_y & \theta_x & 1+S \end{pmatrix} \begin{pmatrix} X \\ Y \\ Z \end{pmatrix}. \quad (22)$$

Weak constraints ensure that the rotation and scale parameters are much smaller than 1 in absolute value. A typical application might have International Terrestrial Reference Frame (ITRF) coordinates represented by the capital letters and GPS estimates represented by the small letters. The following transformation includes the velocities:

$$\begin{pmatrix} \dot{x} \\ \dot{y} \\ \dot{z} \end{pmatrix} = \quad (23)$$

$$\begin{pmatrix} \dot{T}_x \\ \dot{T}_y \\ \dot{T}_z \end{pmatrix} + \begin{pmatrix} 1+S & -\theta_z & \theta_y \\ \theta_z & 1+S & -\theta_x \\ -\theta_y & \theta_x & 1+S \end{pmatrix} \begin{pmatrix} \dot{X} \\ \dot{Y} \\ \dot{Z} \end{pmatrix} + \begin{pmatrix} \dot{S} & -\dot{\theta}_z & \dot{\theta}_y \\ \dot{\theta}_z & \dot{S} & -\dot{\theta}_x \\ -\dot{\theta}_y & \dot{\theta}_x & \dot{S} \end{pmatrix} \begin{pmatrix} X \\ Y \\ Z \end{pmatrix}.$$

Equations (22) and (23) can be rearranged and written together as $$\begin{pmatrix} \Delta x \\ \Delta u \end{pmatrix} = \begin{pmatrix} A_x & 0 \\ A_u & A_x \end{pmatrix} \begin{pmatrix} \theta \\ \dot{\theta} \end{pmatrix}, \qquad (24)$$

where $\Delta x$ is the vector of coordinate differences, $(x_1-X_1)$, $(y_1-Y_1)$, etc., $\Delta u$ is the corresponding vector of velocities, $\theta$ and its derivative represent the transformation parameters Tx, Ty, Tz, S, $\theta x$, $\theta y$, $\theta z$ and their derivatives. Matrices Ax and Au are respectively defined as:

$$A_x = \begin{pmatrix} 1 & 0 & 0 & X_1 & 0 & Z_1 & -Y_1 \\ 0 & 1 & 0 & Y_1 & -Z_1 & 0 & X_1 \\ 0 & 0 & 1 & Z_1 & Y_1 & -X_1 & 0 \\ \vdots & \vdots & \vdots & \vdots & \vdots & \vdots & \vdots \end{pmatrix}, \qquad (25)$$

and $$A_x = \begin{pmatrix} 0 & 0 & 0 & \dot{X}_1 & 0 & \dot{Z}_1 & -\dot{Y}_1 \\ 0 & 0 & 0 & \dot{Y}_1 & -\dot{Z}_1 & 0 & \dot{X}_1 \\ 0 & 0 & 0 & \dot{Z}_1 & \dot{Y}_1 & -\dot{X}_1 & 0 \\ \vdots & \vdots & \vdots & \vdots & \vdots & \vdots & \vdots \end{pmatrix}. \qquad (26)$$

The vector position and velocity differences, $\Delta$, can be obtained with inclusion of the measurement noise V:

$$\Delta = A\theta + V. \qquad (27)$$

Equation (27) has the least squares solution $$\theta = (A^T C^{-1}_\Delta A)^{-1} A^T C^{-1}_\Delta \Delta, \qquad (28)$$

with a covariance matrix $$C_{74} = (A^T C^{-1}_\Delta A)^{-1}, \qquad (29)$$

wherein $C_\Delta$ is the sum of the two regional coordinate covariance matrices:

$$C_\Delta = C_x + C_X. \qquad (30)$$

Thus, a transformation with both positions and corresponding velocities have a total of 14 parameters. The GPS coordinates represented by small letters can be transformed info the frame of the other coordinates $(x_t, y_t, z_t)$ by using the following transformations for positions and velocities:

$$\begin{pmatrix} x_t \\ y_t \\ z_t \end{pmatrix} = \begin{pmatrix} 1-S & \theta_z & -\theta_y \\ -\theta_z & 1-S & \theta_x \\ \theta_y & -\theta_x & 1-S \end{pmatrix} \left[ \begin{pmatrix} x \\ y \\ z \end{pmatrix} - \begin{pmatrix} T_x \\ T_y \\ T_z \end{pmatrix} \right], \qquad (31)$$

and $$\begin{pmatrix} \dot{x}_t \\ \dot{y}_t \\ \dot{z}_t \end{pmatrix} =$$

$$\begin{pmatrix} 1-S & \theta_z & -\theta_y \\ -\theta_z & 1-S & \theta_x \\ \theta_y & -\theta_x & 1-S \end{pmatrix} \left[ \begin{pmatrix} \dot{x} \\ \dot{y} \\ \dot{z} \end{pmatrix} - \begin{pmatrix} \dot{T}_x \\ \dot{T}_y \\ \dot{T}_z \end{pmatrix} - \begin{pmatrix} \dot{S} & -\dot{\theta}_z & \dot{\theta}_y \\ \dot{\theta}_z & \dot{S} & -\dot{\theta}_x \\ -\dot{\theta}_y & \dot{\theta}_x & \dot{S} \end{pmatrix} \begin{pmatrix} x_t \\ y_t \\ z_t \end{pmatrix} \right]. \qquad (32)$$

It is observed that the covariance matrix, $C_x$, is essentially unchanged by transformation because the first few significant digits are not affected.

These new algorithms in accordance with the invention are included in the GIPSY package of the improved GIPSY-OASIS II.

A Post-Processing Utility for Global Terrestrial Reference

This is another unique feature that is developed at JPL. This utility defines a global terrestrial reference frame with internal constraints. This process is an improved classical formulation by Banicek and Krakiwsky in 1986. Two significant innovations are added. First, a total of 14 internal constraints are applied to define the seven reference frame parameters and the corresponding rates. Secondly, tight but finite constraints are used so that the final matrix is fully invertible.

A User Interface for Controlling Spacecraft Orientation

In general, a typical spacecraft can be described as an aggregate of various components: there could be a box-like body, a hyperbolic antenna, a conical after-burner, etc. Each of these components is affected by surface forces such as drag and solar pressure. Since the components are usually non-symmetric one needs to know their exact orientation in space in order to calculate the forces on them. Knowledge of these forces is desirable in calculating the spacecraft trajectory. A complex algorithm is often needed to describe the orientation of each component and the orientation of the spacecraft itself. For example, the orientation of the "X side panel" of a GPS spacecraft is given by the following algorithm: Its normal vector is perpendicular to the s/c-Earth direction, and it lies in the Earth-S/c-Sun plane, pointing toward the half-plane that contain the Sun. This is actually one of the simpler cases.

The inventors developed a unique programming language to construct a user-friendly interface in the improved GOA II package for controlling the orientation of a GPS satellite. This programming language, Component Orientation Description Language (CODL), allows a user to use commands in plain English to specify the orientation of the satellite components or of the satellite itself. CODL addresses the problem of communicating a complex algorithm to a program in a way that is both friendly to the user (i.e., as natural as possible) but also efficient (since the algorithm is executed at every step of the integrator). In particular, CODL uses English and a small set of math symbols to convey an algorithm as a sequence of instructions. The efficiency issue was handled by writing a compiler that translates the set of high-level instruction to FORTRAN code, which is then executed at every step. For instance, the algorithm in the above example can be written in CODL as:

Y='EARTH CROSS SUN'

'Y CROSS EARTH'.

The following examples further illustrate the CODL in its preferred embodiment. The orientation of a flat panel is defined to be its normal. The orientation of a cylinder is defined to be the direction of its axis. The syntax of an instruction line is similar to FORTRAN and the set of all instruction lines per component should be viewed as a short program that defines and manipulates vectors, the final result being the desired normal. Objects (scalars or vectors) are identified by name. Every instruction line in CODL is a definition. A defined object can be either a vector or a scalar. A defined vector is automatically normalized in most cases.

For example, a typical instruction line,

'X+SIDE=Y+SIDE CROSS Z+SIDE', defines the object (vector) X+SIDE (it can be the actual name of the panel you wish to orient, or a new object a user needs to define in order to compute the desired orientation) as the cross product of two previously defined objects (vectors), Y+SIDE and Z+SIDE. X+SIDE is automatically normalized after this operation and in subsequent definition one can use it as a unit vector. The left-hand side of the equal (=) sign, including the equal sign, is optional. If one omits it (and the line reads: 'Y+SIDE CROSS Z+SIDE') the preferred embodiment of the CODL assumes that the object defined is the normal of the corresponding panel. In the preferred embodiment, all items in a line should be separated by white space. A line item can be at most 8 characters long.

The following are a sample of CODL instructions with comments:

[A=] TOWARD SUN: The Sun's direction with respect to the s/c is known internally.

[A=] TOWARD EARTH: The Earth's direction with respect to the s/c is known internally.

[A=] ALONG VELOCITY.

[A=] −B: Useful to orient the opposite panel in a box model.

[A=] B+C.

[A=] B−C.

[A=] B CROSS C.

[a=] B DOT C: a is a scalar.

[A=] b*C: b must be a scalar defined earlier in the process through the dot product or any bona-fide FORTRAN number.

The defined vector (A) is NOT normalized after this operation. Note that only the left operand can be a scalar.

In all but the last two instructions the objects are vectors. A user-can redefine an object, i.e., A=A+B is legal. A user can use objects defined for one component in the instructions for the next component, or add new operation. Furthermore, a component with name 'BUS' or 'SPHERE' has no orientation and one may leave the corresponding orientation instruction empty. Alternatively, a user can indicate that a component has no orientation by typing in the first orientation instruction line 'BUS'or 'SPHERE'.

Although the present invention has been described in detail with reference to a number of particular embodiments, one ordinarily skilled in the art to which this invention pertains will appreciate that various modifications and enhancements may be made without departing from the spirit and scope of the following claims.

What is claimed is:

1. A method of performing yaw compensation on a GPS satellite traveling in an eclipsing orbit around the earth, comprising:

applying a constant biasing signal to an output signal from a sensing device in an attitude control system on a GPS satellite in an eclipsing orbit around the earth, said sensing device operating to detect sunlight, said attitude control system controlling yawing of said GPS satellite with respect to said output signal;

setting said constant biasing signal to a preselected value to cause said attitude control system to produce a biasing yawing angle of said GPS satellite;

using said biasing yawing angle to control said yawing of said GPS satellite when said GPS satellite is not in sunlight;

measuring an actual yawing angle of said GPS satellite; and adjusting said yawing of said GPS satellite to minimize a difference between said actual yawing angle and a desired yawing angle with said attitude control system by an iterative process.

2. A method as in claim 1, wherein said constant biasing signal is set to make said biasing yawing angle to be a minimal yawing angle that is operable by said attitude control system.

3. A method for controlling yawing of a satellite traveling in an eclipsing orbit around the earth, comprising:

representing a maximum yaw rate by a finite backward yaw rate difference and a maximum yaw acceleration by a finite backward yaw acceleration difference;

adjusting said yawing of said satellite upon both shadow entry and shadow exit in said eclipsing orbit by limiting said yawing within said maximum yaw rate and said maximum yaw acceleration; and changing said yawing of said satellite to minimize a difference between a measured yaw angle and a desired yaw angle in presence of the sun.

4. A method of performing yaw compensation on a satellite traveling in an eclipsing orbit around the earth, comprising:

dividing said orbit into a plurality of segments;

using a plurality of analytical formulas to characterize behaviors of yawing and orbiting of said satellite that are associated with each of said segments, said analytical formulas predicting said yawing of said satellite in said segments; and adjusting said yawing of said satellite to a desired yawing according to said predicting.

5. A method as in claim 4, wherein said plurality of segments include:

a nominal attitude segment in which said satellite is in view of the sun;

a shadow crossing segment in which said satellite is in the shadow of the earth;

a post-shadow maneuver including a period from shadow exiting of said satellite to regaining said desired yawing; and a noon maneuver including a duration during which said satellite is closest to the sun and a maximal yawing rate thereof is smaller than a desired yawing rate therein.

6. A method as in claim 4, further comprising using data indicative of attitude of said satellite in said analytical formulas to estimate said yawing and thereby controlling said satellite.

7. A method as in claim 6, wherein said data includes position, velocity and timing of shadow crossings of said satellite.

8. The method as in claim 1, further comprising using information from orbital conditions of said GPS satellite to adjust said yawing.

9. The method as in claim 8, further comprising using information from tracking data for orbital conditions of said GPS satellite to adjust said yawing.

10. The method as in claim 1, further comprising controlling the attitude control system to determine the desired yawing based on the sunlight upon exiting a shadow of the earth.

11. The method as in claim 1, further comprising using said biasing yawing angle to reduce an error in the attitude of said GPS satellite associated with the solar pressure and heat radiation forces.

12. The method as in claim 1, further comprising using said biasing yawing angle to reduce a kinematic error in radiometric measurement of said GPS satellite.

13. The method as in claim 3, further comprising adjusting the maximum yaw rate and maximum yaw acceleration according to conditions of said satellite as said satellite travels at different positions in each round trip around the earth and in different round trips.

14. The method as in claim 3, further comprising adjusting the maximum yaw rate and maximum yaw acceleration according to a change in a yaw momentum of inertia of said satellite.

15. The method as in claim 3, further comprising rejecting measured data on the yaw rate of said satellite in changing said yawing of said satellite for an initial period after said satellite exits the earth's shadow.

16. The method as in claim 3, further comprising determining the desired yawing angle according to orbital conditions of said GPS satellite.

17. The method as in claim 16, further comprising using tracking data of orbital conditions of said GPS satellite to determine said desired yawing angle.

18. The method as in claim 4, further comprising using orbital conditions of said GPS satellite in said predicting.

19. The method as in claim 18, further comprising using tracking data of orbital conditions of said GPS satellite in said predicting.

* * * * *